(12) United States Patent
Schmidt et al.

(10) Patent No.: US 10,104,439 B2
(45) Date of Patent: Oct. 16, 2018

(54) SYSTEMS AND METHODS FOR NAVIGATION OF GROUPS OF MEDIA ASSETS

(71) Applicant: Rovi Guides, Inc., San Carlos, CA (US)

(72) Inventors: Margret B. Schmidt, Redwood City, CA (US); Kenichiro Tanaka, Menlo Park, CA (US); Alexander W. Liston, Menlo Park, CA (US); Elizabeth V. Riley, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 82 days.

(21) Appl. No.: 15/433,878

(22) Filed: Feb. 15, 2017

(65) Prior Publication Data
US 2018/0192150 A1    Jul. 5, 2018

Related U.S. Application Data

(60) Provisional application No. 62/441,897, filed on Jan. 3, 2017.

(51) Int. Cl.
*H04N 21/482*    (2011.01)
*H04N 21/237*    (2011.01)

(52) U.S. Cl.
CPC ....... *H04N 21/4826* (2013.01); *H04N 21/237* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 5,822,123 A * | 10/1998 | Davis | A63F 13/12 725/43 |
| 6,133,962 A | 10/2000 | Proehl et al. | |
| 6,289,346 B1 | 9/2001 | Milewski et al. | |
| 7,853,972 B2 * | 12/2010 | Brodersen | H04N 7/163 725/39 |
| 7,895,624 B1 * | 2/2011 | Thomas | H04N 5/4401 709/219 |
| 9,113,108 B2 | 8/2015 | Sinha et al. | |
| 9,800,910 B2 * | 10/2017 | Singh | H04N 21/251 |
| 2010/0262995 A1 * | 10/2010 | Woods | G06T 15/20 725/40 |
| 2011/0016485 A1 * | 1/2011 | Hubner | H04N 5/4403 725/30 |
| 2011/0283232 A1 * | 11/2011 | Jordan | H04N 5/44543 715/810 |
| 2011/0302158 A1 * | 12/2011 | Sanders | G06F 17/30867 707/723 |

(Continued)

*Primary Examiner* — Alexander Q Huerta
(74) *Attorney, Agent, or Firm* — Haley Guiliano LLP

(57) ABSTRACT

Systems and methods are provided for navigating between groups of media assets based on multiple user inputs of directional navigation commands received within a threshold period of time of each other. Specifically, the system may navigate through a number of ordered groups of media assets without presenting information to the user related to the specific groups (e.g., present to the user media assets associated with the group) in response to receiving the multiple directional navigation commands, thus allowing a user to navigate to a desired group of media assets with fewer distractions.

20 Claims, 9 Drawing Sheets

(56) References Cited

U.S. PATENT DOCUMENTS

| | | | |
|---|---|---|---|
| 2012/0192231 A1* | 7/2012 | Maa | G06F 3/0219 |
| | | | 725/38 |
| 2013/0013372 A1* | 1/2013 | Gomez Uribe | G06Q 10/06 |
| | | | 705/7.29 |
| 2014/0075482 A1* | 3/2014 | Frusciano | H04N 5/44543 |
| | | | 725/52 |
| 2014/0298389 A1* | 10/2014 | Sansom | G06F 17/3082 |
| | | | 725/60 |
| 2015/0012947 A1* | 1/2015 | Zaveri | H04N 21/2407 |
| | | | 725/46 |
| 2015/0256893 A1* | 9/2015 | Jayaram | H04N 21/2408 |
| | | | 725/40 |
| 2015/0356087 A1* | 12/2015 | Alvino | G06F 17/3053 |
| | | | 707/728 |

* cited by examiner

SYSTEMS AND METHODS FOR NAVIGATION OF GROUPS OF MEDIA ASSETS

CROSS-REFERENCE TO RELATED APPLICATIONS

This patent application claims the benefit of U.S. Provisional Patent Application No. 62/441,897, filed Jan. 3, 2017, currently pending, the disclosure of which is hereby incorporated by reference herein in its entirety.

BACKGROUND

Given the plethora of media assets available to consumers, it is often difficult for users to quickly determine media assets they are interested in accessing. In order to aid users, systems exist that visually present media asset identifiers, which contain information relating to media assets. To aid users searching for particular media assets, some systems categorize media assets into groups. The groups of media assets, which, for example, may be based on genre or source, are then presented to users. A selection of a particular group may then enable a user to take an action related to that group.

However, even with categorizing media assets into groups, there still may be a large number of groups that cannot be quickly navigated by a user. Specifically, present systems lack the ability to efficiently navigate between groups of media assets.

SUMMARY

Accordingly, systems and methods are provided herein for navigating between groups of media assets based on multiple user inputs of directional navigation commands received within a period of time. Specifically, the system may navigate through a number of ordered groups of media assets without presenting information to the user related to the specific groups (e.g., presenting to the user media assets associated with the group) in response to receiving the multiple directional navigation commands, thus allowing a user to navigate to a desired group of media assets with fewer distractions. To this end, a media guidance application may generate for display, based on a first display template, indicators for a plurality of groups of media assets and media asset identifiers associated with one of the groups of media assets. The media guidance application may receive a first user input corresponding to a directional navigation command (e.g., a user depressing a key on the remote control corresponding to a down direction) and a second user input corresponding to an additional directional navigational command within a threshold period of time (e.g., 0.5 seconds). In response, the media guidance application may generate for display, based on a second display template, indicators for additional groups of media assets, as well as the plurality of groups of media assets. The media guidance application may determine a new group of media assets to navigate to (e.g., 4 groups down) based on the received directional navigation commands and may generate for display, based on the first display template, indicators for media asset identifiers associated with the new group of media assets.

The above systems and methods may be implemented for a "My Shows" menu that allows a user to quickly navigate between a large number of tailored media asset identifiers and groups of media assets. For example, the "My Shows" menu may include a group of media assets, "May Also Like," which includes media asset identifiers for media assets that the user is likely to enjoy (e.g., based on the user's viewing history and preferences from a user profile). As another example, the "My Shows" menu may include a "Continue Watching" group of media assets, which includes media assets the user has partially viewed based on viewing history stored in a user profile for the user. For media assets a user has previously viewed, an indication of the progress of the user may be displayed with the media asset identifier (e.g., a progress bar) to inform the user whether he or she was nearly finished with a given media asset or had just started it. Additionally, the media asset identifier may include an indication of whether the media asset is a stored recording or from another source (e.g., video-on-demand).

In some aspects, the media guidance application may be configured to accept commands to navigate from a first group of media assets to a second group of media assets based on receiving multiple directional navigation commands within a threshold period of time of one another. Specifically, the media guidance application may link a plurality of groups of media assets and a first plurality of media asset identifiers with a first instance of a first display template, where the first plurality of media asset identifiers is associated with a first group of media assets of the plurality of groups of media assets. For example, the media guidance application may retrieve, either locally from storage or remotely from a server via a communications network, the first display template. The first display template may be any suitable data structure, such as a class or a table, which contains parameters for displaying groups of media assets and media asset identifiers. The media guidance application may generate a first instance of the first display template. The media guidance application may store links to particular locations in storage (e.g., pointers) for the particular groups of media assets and media asset identifiers to be displayed. For example, each group of media assets may be an object that has a plurality of associated media assets. As a specific example, a group of media assets may be for the genre, "Comedy," which may be associated with media assets such as "Happy Gilmore."

The media guidance application may generate for display the first instance of the first display template including a first plurality of indicators for the plurality of groups of media assets and a second plurality of indicators for the first plurality of media asset identifiers. For example, the media guidance application may generate for display rectangular objects of a first size including identifiers for the first plurality of groups of media assets and rectangular objects of a second size including identifiers for the first plurality of media asset identifiers. The media guidance application may generate each indicator based on formatting instructions for the indicator. For example, if one indicator corresponds to a media asset identifier with a long title, then the indicator may be larger than other indicators. Alternatively or additionally, the title may be scaled such that it fits in its entirety in a same sized indicator as other displayed indicators. In some embodiments, the media guidance application may generate for display, with an indicator, additional information based on data stored in a user profile related to the media asset identifier or group of media assets corresponding to the indicator. For example, if a user has viewed a portion of a media asset for which an indicator for the corresponding media asset identifier is displayed, the media guidance application may add a progress bar to denote the user's progress in the media asset.

In some embodiments, the media guidance application may generate a data structure containing a plurality of fields with information needed to generate for display indicators for media asset identifiers and groups of media assets appropriately on the screen (e.g., size and/or location). Specifically, the media guidance application may generate a first data structure according to the first display template, for the first instance of the first display template, where the first data structure includes for each of the plurality of groups of media assets and for each of the first plurality of media asset identifiers a first field, a second field, and a third field. For example, the media guidance application may generate, based on the first display template, a data structure containing a plurality of fields. The data structure may be organized as a table, where each row in the table corresponds to an indicator to be displayed, and each field in the row contains information relating to the indicator. Alternatively, the data structure may be organized as an object of a class, where the class contains attributes for each indicator corresponding to the first display template. The media guidance application may execute an instruction to create an object (e.g., the first instance) of the class (e.g., the first display template) and define the attributes for each indicator.

The media guidance application may store in each of the first field an identifier associated with one of the plurality of groups of media assets or one of the first plurality of media asset identifiers. For example, the media guidance application may generate pointers to locations in memory (i.e., an identifier) containing data associated with a group of media assets or a media asset identifier. For example, the media guidance application may generate a pointer to a location in memory containing a title, pixel information for an image, or any other associated data that may be used to identify the group of media assets or media asset identifier. Alternatively or additionally, the media guidance application may store a URL or other identifier that defines a location remote from the media guidance application containing the data associated with a group of media assets or a media asset identifier as described above.

The media guidance application may store in each of the second field an indication of whether a corresponding identifier in the associated first field is associated with one of the plurality of groups of media assets or associated with one of the first plurality of media asset identifiers. For example, the media guidance application may store a single character, string of characters, or integer indicating whether an identifier stored in a first field corresponds to a group of media assets or a media asset identifier. For example, if media asset identifiers and groups of media assets are the only types of identifiers, a single flag may be stored indicating whether the corresponding identifier is a group of media assets (e.g., set to "true"). The media guidance application may also store in each of the third field a flag indicating whether an indicator associated with the corresponding identifier is to be displayed as selected. For example, the media guidance application may determine that a particular group of media assets or media asset identifier was navigated to and thus was selected. In response, the media guidance application may set the flag in the third field corresponding to the appropriate identifier stored in the first field to "true."

In some embodiments, the media guidance application, when generating for display the first instance of the first display template, formats (e.g., the size, location, shape, etc.) the indicators based on data contained in a data structure corresponding to the first instance of the first display template. Specifically, the media guidance application may retrieve, from each first field in the first data structure, a corresponding identifier. The media guidance application may access the location in memory or at a remote server linked by the identifier to retrieve information (e.g., a title) to be displayed for the particular associated group of media assets or media asset identifier.

The media guidance application may retrieve, from each second field in the data structure, the indication of whether the identifier in the associated first field is for one of the plurality of groups of media assets or one of the first plurality of media asset identifiers. For example, the media guidance application may retrieve the stored indication associated with each identifier of whether the identifier is a group of media assets or a media asset identifier. As a specific example, the media guidance application may retrieve "1" for a media asset identifier and "2" for a group of media assets, "id" for a media asset identifier and "group" for a group of media assets, or any other stored values indicating whether the identifier is a group of media assets or a media asset identifier, as described above.

The media guidance application may format indicators differently based on whether each indicator is for a group of media assets or a media asset identifier. Specifically, the media guidance application may format indicators for each retrieved identifier based on the indication of whether the identifier in the associated first field is for one of the plurality of groups of media assets or one of the first plurality of media asset identifiers. Further to the example, the media guidance application may generate an instruction to generate for display each indicator corresponding to a group of media assets twice as large in length and width as each indicator corresponding to a media asset identifier. The media guidance application may format the size, shape, color, or any other display properties of the indicators by generating instructions transmitted to the graphics circuitry.

The media guidance application may generate for display groups of media assets visually distinguished from media asset identifiers. Specifically, the media guidance application may generate for display each formatted indicator, where each formatted indicator associated with the plurality of groups of media assets is visually distinguished from each formatted indicator associated with the first plurality of media asset identifiers. For example, the media guidance application may generate for display on a display (e.g., of user equipment such as a cell phone) the groups of media assets and media asset identifiers such that the groups of media assets have a different size, shape, color, or other graphical property that allows them to be distinguished from the media asset identifiers.

The media guidance application may receive a user input of a first directional navigation command. For example, the media guidance application may receive a user input via a user input interface, such as a remote control. The media guidance application may determine whether the user input corresponds to a directional navigation command (e.g., navigating in the down direction with a "DOWN" button) or a different command (e.g., to enter a VOD menu with a "VOD" button) based on comparing the received user input with a stored list of commands associated with particular user inputs.

The media guidance application may determine whether a second directional navigation command is received within a threshold time period from when the first directional navigation command is received. For example, upon receiving the first directional navigation command, the media guidance application may start a timer for the threshold period of time (e.g., 5 seconds). The media guidance application may monitor for additional user input corresponding to a second directional navigation command (e.g., another user input of the "DOWN" button on a remote control). If no additional directional navigation command is received before the timer indicates the threshold time period has lapsed, the media guidance application may determine a direction associated with the first directional navigation command. Based on the determined direction, the media guidance application may determine a second group of media assets of the plurality of groups of media assets to navigate to and update the first instance of the first display template to display media asset identifiers associated with the second group of media assets.

The media guidance application may, in response to determining that the second directional navigation command is received within the threshold time period, determine a second group of media assets to navigate to and not generate media asset identifiers for groups of media assets between the initially selected group of media assets. Specifically, the media guidance application may link the plurality of groups of media assets and additional groups of media assets with a second instance of a second display template. For example, in order to fill the screen, since no media asset identifiers are generated with the second display template, the media guidance application may add additional groups of media assets, which may allow the user to see more groups of media assets at a time for easier navigation. For example, the media guidance application may generate pointers to locations in memory (i.e., an identifier) containing data associated with one of the plurality of groups of media assets or the additional groups of media assets. For example, the media guidance application may generate a pointer to a location in memory containing a title, pixel information for an image, or any other associated data that may be used to identify one of the groups of media assets. The media guidance application may store the pointers in fields of the second instance of the second display template.

In some embodiments, when linking the plurality of groups of media assets and additional groups of media assets with the second instance of the second display template, the media guidance application may generate a data structure containing a plurality of fields with information needed to generate for display indicators for groups of media assets in both rows and columns. Specifically, the media guidance application may generate a second data structure according to the second display template, for the second instance of the second display template, where the second data structure includes for each of the plurality of groups of media assets and for each of the additional groups of media assets a fourth field. For example, the media guidance application may generate, based on the first display template, a data structure containing a plurality of fields. The data structure may be organized as a table, where each row in the table corresponds to an indicator to be displayed, and each field contains information relating to the indicator. Alternatively, the data structure may be organized as an object of a class, where the class contains attributes for each indicator corresponding to the first display template. The media guidance application may execute an instruction to create an object (e.g., the first instance) of the class (e.g., the first display template) and define the attributes for each indicator. The media guidance application may store in each of the fourth field one or more coordinates defining a display location for a corresponding identifier stored in an associated first field, where the one or more coordinates define a row of a plurality of rows and a column of a plurality of columns for displaying an indicator associated with a corresponding identifier. For example, the media guidance application may store coordinates in Euclidean space corresponding to pixels where a given indicator should be displayed, or coordinates for specific rows and columns where the indicator should be displayed (e.g., (1,2) corresponding to column 1, row 2).

The media guidance application may generate for display additional groups of media assets in addition to the previously generated groups of media assets. Specifically, the media guidance application may generate for display the second instance of the second display template including a third plurality of indicators for (1) the plurality of groups of media assets and (2) the additional groups of media assets. For example, the media guidance application may generate for display rectangular objects including identifiers (e.g., a title) of each of both the plurality of groups of media assets and the additional groups of media assets. The media guidance application may generate each indicator based on formatting instructions for the indicator. For example, if one indicator corresponds to a group of media assets with a large image, the indicator may be larger than other indicators. Alternatively, the image may be scaled such that it fits in its entirety in a same-sized indicator as other displayed indicators. In some embodiments, the media guidance application may generate the second instance of the second display template for display immediately upon receiving the second user directional navigation command. However, in some embodiments, the media guidance application may generate the second instance of the second display template for display upon receiving the first user directional navigation command.

In some embodiments, the media guidance application, when generating for display the second instance of the second display template, may visually distinguish a selected indicator from other indicators. Specifically, the media guidance application may determine that a first indicator of the third plurality of indicators corresponds to a first identifier that is to be displayed as selected. For example, based on the value of a flag for whether an identifier is selected being "true" associated with the first identifier stored in a data structure for the second instance of the second display template, the media guidance application may determine that the first indicator is to be displayed as selected. The media guidance application may visually distinguish the first indicator from other indicators in the third plurality of indicators. For example, the media guidance application may generate a different graphical feature (e.g., a different color, size, location, or border) from the other indicators to visually distinguish that the first indicator is selected.

The media guidance application may compare the first directional navigation command and the second directional navigation command with a plurality of stored directional navigation commands to determine a first direction associated with the first directional navigation command and a second direction associated with the second directional navigation command. For example, the media guidance application may receive a first directional navigation command of a "DOWN" button and determine that the command corresponds to a request to move down (the first direction) to the next group of media assets that is displayed. The media guidance application may determine that the second received command, e.g., also of the "DOWN" button, is to move down (the second direction) one additional group of media assets. In some embodiments, groups of media assets may be arranged according to the second display template in rows and columns, such that the two directional navigation commands received by the media guidance application may correspond to navigation in two dimensions, which allows the user to see even more groups of media assets at a single time.

The media guidance application may navigate, according to the first direction and the second direction, from a first indicator for the first group of media assets to a second indicator for a second group of media assets. For example, the media guidance application may navigate to the indicator corresponding to the group of media assets based on the ordered combination of the directions of the two directional navigation commands. For example, if the ordered combination of the directions of the two directional navigation commands is to move two indicators down, then the media guidance application may navigate to the indicator corresponding to a second group of media assets two down from the previously selected one. Because the two directional navigation commands were received within the threshold time period, the media guidance application does not generate for display media asset identifiers associated with any of the groups of media assets that were navigated through (e.g., by updating the first display template). One of the advantages of this approach is to save processing time by not loading media asset identifiers that the user is uninterested in. Another advantage of this approach is allowing a user to navigate to a displayed indicator with fewer distractions since the user quickly entering multiple directional navigation commands indicates a desire to navigate through a number of the displayed indicators without stopping on an intermediate indictor. Yet another advantage of this is approach is allowing a user to see more groups of media assets on the display screen by removing media asset identifiers, which may help the user find a group of media assets that he or she is searching for.

In some embodiments, when navigating from a first indicator to a second indicator, the media guidance application may update a flag corresponding to whether a particular indicator is selected. Specifically, the media guidance application may update a first flag of a corresponding third field associated with the first indicator to indicate that the first indicator is no longer selected. For example, the media guidance application may, in response to determining that the first indicator is no longer selected based on the received directional navigation commands, update the first flag to "false," indicating that the first indicator is no longer selected. The media guidance application may update a second flag of a corresponding third field associated with the second indicator to indicate that the second indicator is selected. For example, the media guidance application may, in response to determining that the second indicator should now be selected based on the received directional navigation commands, update the second flag to "true" indicating that the second indicator is now selected.

In some embodiments, when determining which indicator to navigate to responsive to the received directional navigation commands, the media guidance application may determine a number of indicators to navigate through based on a duration that the second directional navigation command was selected. Specifically, the media guidance application may determine a duration associated with the second navigation command. For example, the media guidance application may start a timer when the second directional navigation command is first received and stop the timer when the second directional navigation command ceases to be received. As a specific example, the media guidance application may start the timer when a user depresses a button and stop the timer when the button is no longer depressed. The media guidance application may compare the duration with a plurality of stored durations, where each of the stored durations corresponds to instructions to a number of indicators to navigate through. For example, the media guidance application may access a data structure containing a plurality of durations and corresponding numbers of indicators to navigate through. The media guidance application may, based on comparing the duration with a plurality of stored durations, determine the number of indicators to navigate through. For example, the media guidance application may determine that a "DOWN" key was depressed for 3 seconds, which may correspond to navigating through 5 indicators based on the comparison with the data structure. As another example, the media guidance application may determine that a user selected a directional navigation command using a touch-screen interface of a touch-screen device for 3 seconds, which may correspond to navigating through 3 indicators based on the comparison with the data structure. In some embodiments, the data structure may contain device-specific corresponding numbers of indicators to navigate through. For example, the media guidance application may, for the same command received for the same duration, retrieve different values for the number of indicators to navigate through for different device (e.g., a smartphone and a set-top-box).

The media guidance application may link media asset identifiers associated with the newly selected second group of media assets to a display template. Specifically, the media guidance application may link a second plurality of media asset identifiers, instead of the first plurality of media asset identifiers, with the first instance of the first display template, where the second plurality of media asset identifiers is associated with the second group of media assets. For example, the media guidance application may update the first instance of the first display template to reflect that a new group of media assets is selected. For example, the media guidance application may determine that the group of media assets that was previously ordered three below the previously selected group of media assets is now selected based on the two directional navigation commands. The media guidance application may link media asset identifiers associated with the newly selected group of media assets with the first instance of the display template instead of the media asset identifiers that were previously linked (e.g., by clearing pointers to locations in memory that correspond to media asset identifiers in the first instance of the first template and generating and storing new pointers in their place).

The media guidance application may generate for display the first instance of the first display template including a fourth plurality of indicators for the second plurality of media asset identifiers. For example, the media guidance application may generate for display rectangular objects including identifiers for the second plurality of media asset identifiers, in the same manner as described above for the first plurality of media asset identifiers.

In some embodiments, when generating for display the first instance of the first display template including the fourth plurality of indicators for the second plurality of media asset identifiers, the media guidance application may remove groups of media assets that were navigated through. Specifically, the media guidance application may determine a subset of (1) the plurality of groups of media assets and (2) the additional groups of media assets that were not navigated through based on the first directional navigation command and the second directional navigation command. For example, the media guidance application may determine that originally indicators A, B, and C were linked to the first instance of the first display template and displayed. The media guidance application may have added indicators D and E of groups of media assets when the second instance of the second display template was generated for display. If, based on the received directional navigation commands, the media guidance application navigates to C, then group of media assets B was navigated through. Thus, groups A, C, D, and E were not navigated through and comprise the subset. In some embodiments, the initial selected group is included as being navigated through, in which case groups C, D, and E were not navigated through (or initially selected) and comprise the subset.

The media guidance application may remove links in the first instance of the first display template to the plurality of groups of media assets. For example, if the subset comprises groups C,D, and E and groups A, B, and C are linked in the first instance of the first display template, then the media guidance application removes the links to groups A and B, as they have been navigated through. The media guidance application may link the subset with the first instance of the first display template. For example, the media guidance application replaces the removed links to groups of media assets A and B with groups of media assets D and E. The media guidance application may generate for display a fifth plurality of indicators for the subset. For example, the media guidance application may generate, with the fourth plurality of indicators, indicators for the groups of media assets that are part of the subset of groups of media assets. In this way, the media guidance application does not generate for display groups of media assets that the user has already seen and chosen to navigate through.

In some embodiments, the media guidance application may determine a group of media assets to navigate to based on a sequence of user input received within a threshold time period. By utilizing a plurality of different sequences, a user can navigate quickly through groups of media assets more precisely and save time finding a category that he or she is looking for. Specifically, the media guidance application may receive a third directional navigation command within the threshold time period from when the second directional navigation command is received. For example, upon receiving the second directional navigation command the media guidance application may start a timer for the threshold period of time (e.g., 5 seconds). In some embodiments, the threshold period of time may be different depending on the previously received directional navigation command and/or the number of previously received directional navigation commands. The media guidance application may monitor for additional user input corresponding to a third directional navigation command (e.g., another user input of the "DOWN" button on a remote control).

The media guidance application may compare the third directional navigation command with each initial directional navigation command associated with each navigation sequence of a plurality of stored navigation sequences, where each navigation sequence comprises a series of ordered directional navigation commands. For example, the media guidance application may access a data structure containing navigation sequences, stored either locally in memory or remotely at a server accessible via a communications network, and compare the received third directional navigation command with the first navigation command of each stored navigation sequence in the data structure. The media guidance application may determine based on the comparing, that the third directional navigation command is an initial directional navigation command for one or more stored navigation sequences. For example, the media guidance application may determine that the initial directional navigation command for one or more of the stored navigation sequences in the data structure corresponds to the third directional navigation command received from the user.

The media guidance application, in response to determining that the third directional navigation command is the initial directional navigation command for one or more stored navigation sequences, may receive at least one subsequent directional navigation command, where each subsequent directional navigation command of the at least one subsequent directional navigation command is received within a threshold time from when an immediately preceding directional navigation command was received. For example, the media guidance application may receive a fourth directional navigation command from the user within the threshold period of time of the third directional navigation command. The media guidance application may continue to monitor for subsequent directional navigation commands until a directional navigation command is not received within the threshold time of the previous received directional navigation command.

The media guidance application may compare the at least one subsequent directional navigation command with remaining directional navigation commands of the one or more stored navigation sequences. For example, the media guidance application may compare the directional navigation commands, in the order that they were received, with directional navigation commands of navigation sequences that matched the third directional navigation command to determine if the subsequently received directional navigation commands complete any navigation sequences. The media guidance application may determine, based on the at least one subsequent directional navigation command matching the remaining directional navigation commands for a navigation sequence of the one or more navigation sequences, that the at least one subsequent directional navigation command completes the navigation sequence. For example, if the media guidance application receives four additional "DOWN" commands and a navigation sequence is completed by four additional "DOWN" commands, then the media guidance application may determine that the sequence matches the received input.

The media guidance application may navigate, based on an instruction associated with the completed navigation sequence, from the second indicator for the second group of media assets to a third indicator for a third group of media assets. For example, the media guidance application may retrieve a stored instruction associated with the completed navigation sequence from a field in a data structure. The media guidance application may determine, based on the instruction, a number of indicators to navigate through and a direction to navigate. In some embodiments, the instruction may contain multiple directions and numbers of indicators to navigate through in a particular order (e.g., if the indicators are arranged in a grid of rows and columns). As a specific example, an instruction for four "DOWN" commands received in a row may be to navigate to the indicator eight indicators down from the current indicator. In response, the media guidance application may navigate to the indicator eight below the current indicator and update the first instance of the first display template, as described above.

In some embodiments, a user may enter a navigation sequence multiple times, or once with a portion of the navigation sequence reentered. In this instance, the particular sequence may not be stored, but the media guidance application may adjust the instruction associated with the navigation sequence. Specifically, the media guidance application may determine that the at least one subsequent directional navigation command includes additional commands after the completed navigation sequence. For example, the media guidance application may determine that after matching a navigation sequence that requires four "DOWN" commands, the user also inputted an additional two "DOWN" commands. The media guidance application may determine whether the additional received commands correspond to a portion of the completed navigation sequence. For example, the media guidance application may determine that since two "DOWN" commands correspond to two commands in the matched sequence, they correspond to a portion of the completed navigation sequence. In some embodiments, the media guidance application may determine whether a threshold number of commands are matched in order to determine that a portion of the navigation sequence is matched. For example, the media guidance application may determine that two additional "DOWN" commands do not correspond to any adjustment to the instruction, but four "DOWN" commands would (e.g., if the threshold is three additional commands matching a portion of the navigation sequence).

The media guidance application, in response to determining that the additional commands correspond to the portion of the completed navigation sequence, may adjust the instruction associated with the completed navigation sequence. For example, the media guidance application may, based on a predefined rule-set for the number of additional commands matched to the navigation sequence, determine to adjust the instruction. For example, the media guidance application may determine that if three additional "DOWN" commands are received, to increase the number of indicators that are navigated through by three from the number indicated in the instruction associated with the navigation sequence. The media guidance application may navigate, based on the adjusted instruction, to a fourth indicator for a fourth group of media assets. For example, if the instruction was to navigate to an indicator eight below the currently selected indicator, the media guidance application may navigate to the indicator eleven below, based on the adjusted instruction.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described for navigating between groups of media assets based on multiple user inputs of directional navigation commands received within a period of time of each other. Specifically, the system may navigate through a number of ordered groups of media assets without presenting information to the user related to the specific groups (e.g., presenting to the user indicators of media assets associated with the group) in response to receiving the multiple directional navigation commands, thus allowing a user to navigate to a desired group of media assets with fewer distractions. To this end, a media guidance application may generate for display, based on a first display template, indicators for a plurality of groups of media assets and media asset identifiers associated with one of the groups of media assets. The media guidance application may receive a first user input corresponding to a directional navigation command (e.g., a user depressing a key on the remote control corresponding to a down direction) and a second user input corresponding to an additional directional navigational command within a threshold period of time (e.g., 0.5 seconds). In response, the media guidance application may generate for display, based on a second display template, indicators for additional groups of media assets, as well as the plurality of groups of media assets. The media guidance application may determine a new group of media assets to navigate to (e.g., 4 groups down) based on the received directional navigation commands and may generate for display, based on the first display template, indicators for media asset identifiers associated with the new group of media assets.

Figure 1:
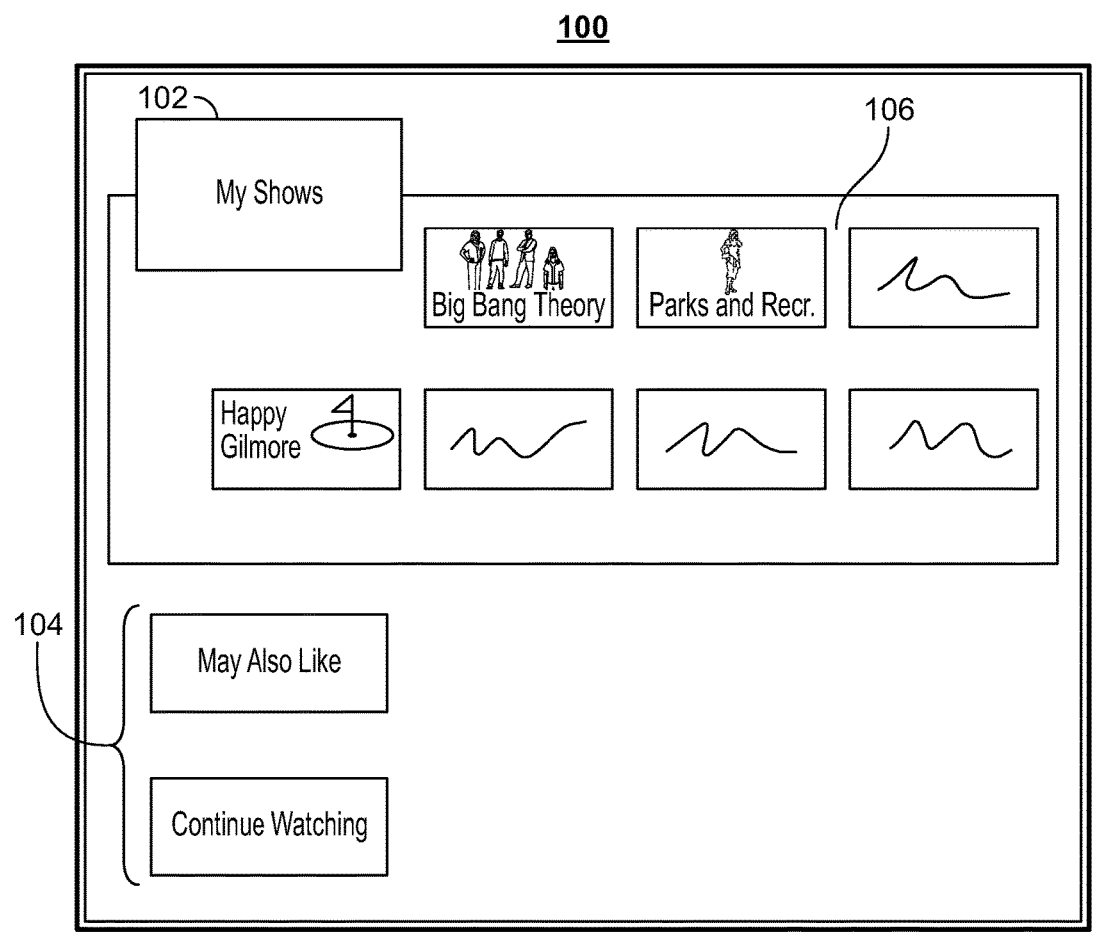
FIG. 1 shows an illustrative example of a display screen with indicators for both groups of media assets and media asset identifiers, in accordance with some embodiments of the disclosure.

FIG. 1 shows an illustrative example of a display screen with indicators for both groups of media assets and media asset identifiers, in accordance with some embodiments of the disclosure. For example, user equipment may execute a media guidance application that may generate display 100. Display 100 may include groups of media assets 102 and 104. Display 100 may also include media asset identifiers 106 associated with group of media assets 102, which is the currently selected group of media assets. Display 100 may appear on one or more user devices.

As referred to herein, "a group of media assets" refers to two or more media assets that are related and grouped by a common criterion. In some embodiments, the criterion may comprise any or multiple of: actor, episode title, series title, genre, release date, keywords, director, writer, studio, producer, or another suitable criterion. In some embodiments, the criterion may be related to data stored in a user profile. For example, the group of media assets may include media assets recently viewed by a user (e.g., based on a stored viewing history), recommendations of media assets based on indications in the user profile of media assets the user enjoys, or media assets partially viewed by the user. In some embodiments, a group may be created based on a criterion, but may only be associated with a single media asset at specific times. For example, for a new series, a group of media assets may refer to the series, but after only the first episode has aired only one media asset (e.g., the first episode) may be associated with the group of media assets. As referred to herein, "a media asset identifier" refers to any graphics, text, or other data describing a media asset. In some embodiments, the media asset identifier may identify a series of media assets. In other embodiments, the media asset identifier may identify a movie, podcast, news article, or other form of consumable media content such that a user can recognize the content.

As referred to herein, a "directional navigation command" refers to any user input that requests to select a displayed indicator in the given direction. For example, a directional navigation command may be received based on a user depressing arrow keys on a remote control. In some embodiments, a directional navigation command may be received based on a user pressing a particular sequence of keys corresponding to movement in a specific direction. For example, a user may press a green button on a remote control three times, which may correspond to a request to navigate to a displayed indicator 9 down from a currently selected one.

In some embodiments, the media guidance application may be configured to accept commands to navigate from a first group of media assets to a second group of media assets based on receiving multiple directional navigation commands within a threshold period of time of each other. Specifically, the media guidance application may link a plurality of groups of media assets (e.g., groups of media assets 102 and 104) and a first plurality of media asset identifiers (e.g., media asset identifiers 106) with a first instance of a first display template (e.g., used to generate display 100), where the first plurality of media asset identifiers is associated with a first group of media assets of the plurality of groups of media assets. For example, the media guidance application may retrieve, either from local storage or from a remote server via a communications network, the first display template.

Specifically, the first display template may be any suitable data structure, such as a class or a table that contains parameters for displaying groups of media assets and media asset identifiers. The media guidance application may generate a first instance of the first display template. For example, if the first display template is a class, then the first instance may be an object of that class, or if the first display template is a table, the first instance may be a new instance of the table with a plurality of empty fields. The media guidance application may store links to particular locations in local storage or at a remote server (e.g., pointers) for the particular groups of media assets (e.g., groups of media assets 102 and 104) and media asset identifiers (e.g., media asset identifiers 106) to be displayed. For example, the media guidance application may store identifiers in fields of the table, or by setting the values of attributes for the object (e.g., when the object is initialized). As a specific example, the media guidance application may store identifiers (e.g., corresponding to media asset identifiers 106) in fields of a table for a group of media assets (e.g., group of media assets 102) for the genre, "My Shows," which may be associated with media assets such as "Happy Gilmore."

The media guidance application may generate for display the first instance of the first display template including a first plurality of indicators for the plurality of groups of media assets and a second plurality of indicators for the first plurality of media asset identifiers. For example, the media guidance application may generate for display rectangular objects of a first size including identifiers for the first plurality of groups of media assets (e.g., groups of media assets 102 and 104) and rectangular objects of a second size including identifiers for the first plurality of media asset identifiers (e.g., media asset identifiers 106). The media guidance application may generate each indicator based on formatting instructions for the indicator. For example, if one indicator corresponds to a media asset identifier with a long title, then the indicator may be larger than other indicators. Alternatively or additionally, the title may be scaled such that it fits in its entirety in a same-sized indicator as other displayed indicators.

In some embodiments, the media guidance application may generate a data structure containing a plurality of fields with information needed to generate for display indicators for media asset identifiers and groups of media assets appropriately on the screen (e.g., size and/or location). Specifically, the media guidance application may generate a first data structure according to the first display template, for the first instance of the first display template, where the first data structure includes for each of the plurality of groups of media assets and for each of the first plurality of media asset identifiers a first field, a second field, and a third field. For example, the media guidance application may generate, based on the first display template, a data structure containing a plurality of fields. The data structure may be organized as a table, where each row in the table corresponds to an indicator to be displayed, and each field in the row contains information relating to the indicator. Alternatively or additionally, the data structure may be organized as an object of a class, where the class contains attributes for each indicator corresponding to the first display template. The media guidance application may execute an instruction to create an object (e.g., the first instance) of the class (e.g., the first display template) and define the attributes for each indicator. For example, the attributes may be a string defining the type of information the indicator will display (e.g., a group of media assets or a media asset identifier) and a pointer to a location in storage containing the information to be displayed.

The media guidance application may store in each of the first field an identifier associated with one of the plurality of groups of media assets or one of the first plurality of media asset identifiers. For example, the media guidance application may generate pointers to locations in memory containing data associated with a group of media assets (e.g., one of groups of media assets 102 and 104) or a media asset identifier (e.g., one of media asset identifiers 106). For example, the media guidance application may generate a pointer to a location in memory containing a title, pixel information for an image, or any other associated data that may be used to identify the group of media assets or a media asset identifier. Alternatively or additionally, the media guidance application may store an identifier that defines a location remote from a device executing the media guidance application containing the data associated with a group of media assets or a media asset identifier as described above.

The media guidance application may store in each of the second field an indication of whether a corresponding identifier in the associated first field is associated with one of the plurality of groups of media assets or associated with one of the first plurality of media asset identifiers. For example, the media guidance application may store a single character, string of characters, or integer indicating whether an identifier stored in a first field corresponds to a group of media assets (e.g., one of groups of media assets 102 or 104) or a media asset identifier (e.g., one of media asset identifiers 106). For example, if media asset identifiers and groups of media assets are the only types of identifiers, a single flag may be stored indicating whether the corresponding identifier is a group of media assets (e.g., a Boolean value set to "true"). If additional information is to be displayed based on the first display template that is not a group of media assets or media asset identifier, the media guidance application may either store multiple Boolean values, or a string such as "identifier" or "group," defining a media asset identifier and group of media assets, respectively. The media guidance application may also store in each of the third field a flag indicating whether an indicator associated with the corresponding identifier is to be displayed as selected. For example, as described further below with respect to FIG. 2, the media guidance application may determine that a particular group of media assets or media asset identifier was navigated to and thus was selected. In response, the media guidance application may set the flag in the third field corresponding to the appropriate identifier stored in the first field to "true." For example, the flag may be a Boolean value, which when set to "true" may indicate that the corresponding identifier is to be displayed as selected.

In some embodiments, the media guidance application may, when generating for display the first instance of the first display template, format (e.g., the size, location, shape, etc.) the indicators based on data contained in a data structure corresponding to the first instance of the first display template. Specifically, the media guidance application may retrieve, from each first field in the first data structure, a corresponding identifier. For example, the media guidance application may retrieve (e.g., by executing an instruction in a database query language such as SQL) each identifier stored in the data structure. The media guidance application may access the location in storage or at a server linked by the identifier to retrieve information (e.g., a title) to be displayed for the particular associated group of media assets (e.g., one of groups of media assets 102 or 104) or media asset identifier (e.g., one of media asset identifier 106).

The media guidance application may retrieve, from each second field in the data structure, the indication of whether the identifier in the associated first field is for one of the plurality of groups of media assets or one of the first plurality of media asset identifiers. For example, the media guidance application may retrieve (e.g., by executing an instruction in a database query language such as SQL) the stored indication associated with each identifier of whether the identifier is a group of media assets (e.g., one of group of media assets 102 or 104) or a media asset identifier (e.g., one of media asset identifiers 106). As a specific example, the media guidance application may retrieve "1" for a media asset identifier and "2" for a group of media assets, "id" for a media asset identifier and "group" for a group of media assets, or any other stored values indicating whether the identifier is a group of media assets or a media asset identifier, as described above.

The media guidance application may format indicators differently based on whether each indicator is for a group of media assets or a media asset identifier. Specifically, the media guidance application may format indicators for each retrieved identifier based on the indication of whether the identifier in the associated first field is for one of the plurality of groups of media assets or one of the first plurality of media asset identifiers. For example, the media guidance application may generate an instruction to an API which interfaces with graphics circuitry (e.g., a GPU) to format particular indicators with a set of attributes based on whether the associated identifier corresponds to a group of media assets (e.g., one of group of media assets 102 or 104) or a media asset identifier (e.g., one of media asset identifiers 106). Further to the example, the media guidance application may generate an instruction to generate for display each indicator corresponding to a group of media assets twice as large in length and width as each indicator corresponding to a media asset identifier. The media guidance application may format the size, shape, color, or any other display properties of the indicators by generating instructions transmitted to the graphics circuitry.

The media guidance application may generate for display groups of media assets visually distinguished from media asset identifiers. Specifically, the media guidance application may generate for display each formatted indicator, where each formatted indicator associated with the plurality of groups of media assets is visually distinguished from each formatted indicator associated with the first plurality of media asset identifiers. For example, the media guidance application may generate display 100 on a display (e.g., of user equipment such as a smart phone) including the groups of media assets (e.g., groups of media assets 102 and 104) and media asset identifiers (e.g., media asset identifiers 106) such that the groups of media assets have a different size, shape, color, or other graphical property that allows them to be distinguished from the media asset identifiers.

The media guidance application may receive a user input of a first directional navigation command. For example, the media guidance application may receive a user input via a user input interface (e.g., as described below further with respect to FIGS. 6-7), such as a remote control. The media guidance application may determine whether the user input corresponds to a directional navigation command (e.g., navigating in the down direction with a "DOWN" button) or a different command (e.g., to enter a VOD menu with a "VOD" button) based on comparing the received user input with a stored list of commands associated with particular user inputs.

The media guidance application may determine whether a second directional navigation command is received within a threshold time period from when the first directional navigation command is received. For example, upon receiving the first directional navigation command the media guidance application may start a timer for the threshold period of time (e.g., 0.5 seconds). The media guidance application may monitor for additional user input corresponding to a second directional navigation command (e.g., another user input of the "DOWN" button on a remote control). If no additional directional navigation command is received before the timer indicates the threshold time period has lapsed, the media guidance application may determine a direction associated with the first directional navigation command. Based on the determined direction, the media guidance application may determine a second group of media assets of the plurality of groups of media assets to navigate to and update the first instance of the first display template to display media asset identifiers associated with the second group of media assets. For example, the media guidance application may update an indication in the first instance of the first display template of the newly selected group of media assets and generate for display, based on the updated template, a new display similar to FIG. 1. As a specific example, if the media guidance application receives one "DOWN" command and no additional commands within the time period, the media guidance application may navigate to a group of media assets 104 that is one below the currently selected group of media assets 102 (e.g., "May Also Like") and generate a new set of media asset identifiers associated with the newly selected group of media assets. However, if the media guidance application receives multiple directional navigation commands within the threshold time period of each other, then the media guidance application may generate for display the display shown in FIG. 2.

Figure 2:
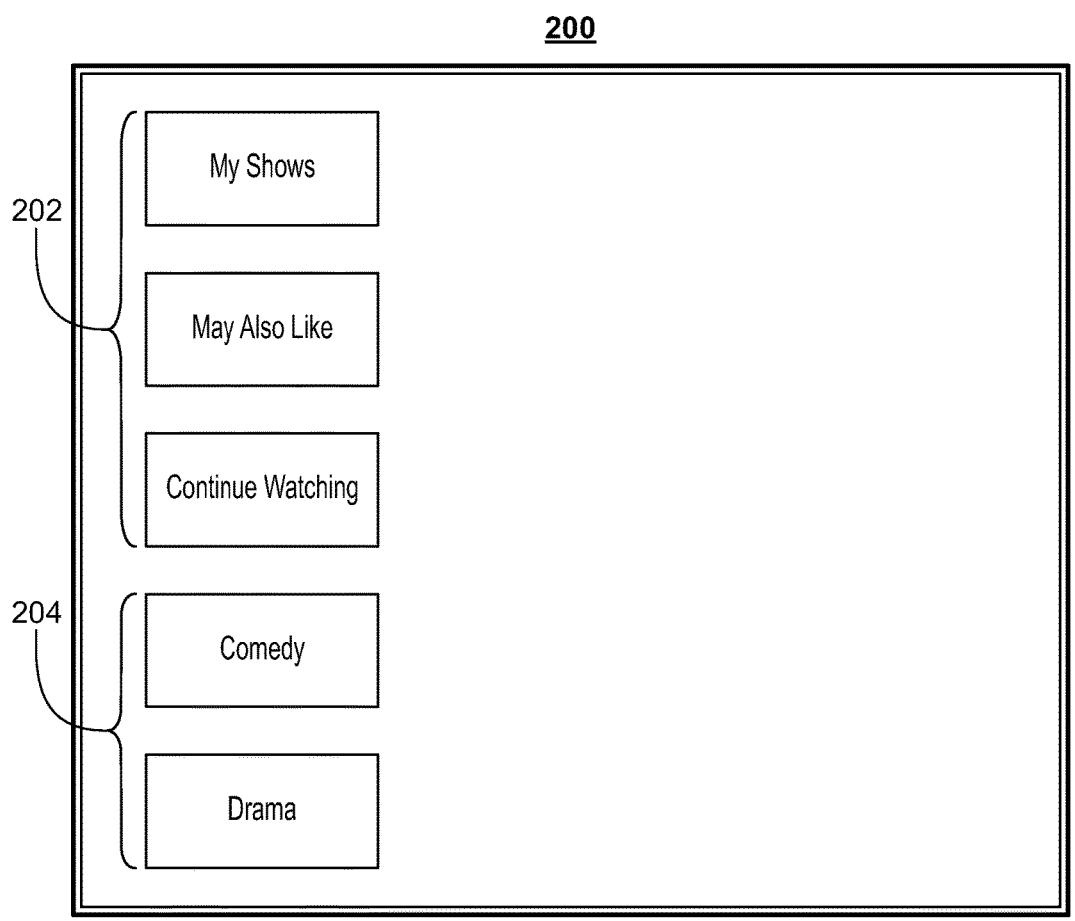
FIG. 2 shows an illustrative example of a display screen with indicators for groups of media assets, in accordance with some embodiments of the disclosure.

FIG. 2 shows an illustrative example of a display screen with indicators for groups of media assets, in accordance with some embodiments of the disclosure. For example, user equipment (e.g., as described further below with respect to FIGS. 6-7) may execute a media guidance application which generates display 200. Display 200 includes groups of media assets 202 and 204. Groups of media assets 202 were previously displayed when generating display 100. However, since display 200 has more space, due to not displaying any media asset identifiers, additional groups of media assets 204 are also displayed. Display 200 may appear on one or more user devices (e.g., set-top box, smartphone, electronic table, or another suitable user device).

In some embodiments, the media guidance application may, in response to determining that the second directional navigation command is received within the threshold time period, determine a second group of media assets to navigate to and not generate media asset identifiers for groups of media assets between the initially selected group of media assets. Specifically, the media guidance application may link the plurality of groups of media assets (e.g., groups of media assets 202) and additional groups of media assets (e.g., additional groups of media assets 204) with a second instance of a second display template (e.g., to generate display 200). For example, in order to fill the screen, since no media asset identifiers are generated with the second display template, the media guidance application may add additional groups of media assets which may allow the user to see more groups of media assets at a time for easier navigation. For example, the media guidance application may store pointers to locations in storage of identifiers for the plurality of groups of media assets and identifiers for the additional groups of media assets in fields of an instance of the second display template, similar to as described above for generating and storing pointers in the instance of the first display template.

In some embodiments, when linking the plurality of groups of media assets and additional groups of media assets with the second instance of the second display template, the media guidance application may generate a data structure containing a plurality of fields with information needed to generate for display indicators for groups of media assets in both rows and columns. Specifically, the media guidance application may generate a second data structure (e.g., used to generate display 200) according to the second display template, for the second instance of the second display template, where the second data structure includes for each of the plurality of groups of media assets (e.g., groups of media assets 202) and for each of the additional groups of media assets (e.g., additional groups of media assets 204) a fourth field. For example, the media guidance application may generate, based on the first display template, a data structure containing a plurality of fields. The data structure may be organized as a table, where each row in the table corresponds to an indicator to be displayed, and each field contains information relating to the indicator. Alternatively or additionally, the data structure may be organized as an object of a class, where the class contains attributes for each indicator corresponding to the first display template. The media guidance application may execute an instruction to create an object (e.g., the first instance) of the class (e.g., the first display template) and define the attributes for each indicator. The media guidance application may store in each of the fourth field one or more coordinates defining a display location for a corresponding identifier stored in an associated first field, where the one or more coordinates define a row of a plurality of rows and a column of a plurality of columns for displaying an indicator associated with a corresponding identifier. For example, the media guidance application may store coordinates in Euclidean space corresponding to pixels where a given indicator should be displayed, or coordinates for specific rows and columns where the indicator should be displayed (e.g., (1,2) corresponding to column 1, row 2).

The media guidance application may generate for display additional groups of media assets in addition to the previously generated groups of media assets. Specifically, the media guidance application may generate for display the second instance of the second display template including a third plurality of indicators for (1) the plurality of groups of media assets and (2) the additional groups of media assets. For example, the media guidance application may generate for display rectangular objects including identifiers (e.g., a title) of each of both the plurality of groups of media assets (e.g., groups of media assets 202) and the additional groups of media assets (e.g., additional groups of media assets 204). The media guidance application may generate each indicator based on formatting instructions for the indicator (e.g., as described above with respect to FIG. 1). For example, if one indicator corresponds to a group of media assets with a large image, the indicator may be larger than other indicators. Alternatively, the image may be scaled such that it fits in its entirety in a same-sized indicator as other displayed indicators. In some embodiments, the media guidance application may generate the second instance of the second display template (e.g., display 200) for display immediately upon receiving the second user directional navigation command. However, in some embodiments, the media guidance application may generate the second instance of the second display template (e.g., display 200) for display upon receiving the first user directional navigation command.

In some embodiments, the media guidance application, when generating for display the second instance of the second display template, may visually distinguish a selected indicator from other indicators. Specifically, the media guidance application may determine that a first indicator of the third plurality of indicators corresponds to a first identifier that is to be displayed as selected. For example, based on the value of a flag for whether an identifier is selected being "true" associated with the first identifier stored in a data structure for the second instance of the second display template, the media guidance application may determine that the first indicator is to be displayed as selected. The media guidance application may visually distinguish the first indicator from other indicators in the third plurality of indicators. For example, the media guidance application may generate a different graphical feature (e.g., a different color, size, location, or border) from the other indicators to visually distinguish that the first indicator is selected. As a specific example, after receiving a second user directional navigation command within the threshold time, the media guidance application may wait for additional user inputs to determine which indicator the user desires to select and generates display 200. Further to the example, the media guidance application may continue to generate the indicator that was first selected (e.g., "My Shows") as selected or may select a different indicator based on a direction of each command received within the threshold time period (e.g., "May Also Like" may be visually distinguished as selected after the media guidance application receives a "DOWN" command). However, the media guidance application may wait to display media asset identifiers associated with a selected group of media assets (e.g., as described below in FIG. 3) until no additional commands are received within a threshold time of the last received command.

The media guidance application may compare the first directional navigation command and the second directional navigation command with a plurality of stored directional navigation commands to determine a first direction associated with the first directional navigation command and a second direction associated with the second directional navigation command. For example, the media guidance application may receive a first directional navigation command of a "DOWN" button and determine that the command corresponds to a request to move down (the first direction) to the next group of media assets (e.g., to one of group of media assets 202 and 204) that is displayed. The media guidance application may determine that the second received command, e.g., also of the "DOWN" button, is to move down (the second direction) one additional group of media assets. In some embodiments, groups of media assets may be arranged according to the second display template in rows and columns, such that the two directional navigation commands received by the media guidance application may correspond to navigation in two dimensions, which allows the user to see even more groups of media assets at a single time. After determining that the multiple received directional navigation commands correspond to a request to navigate to a specific indicator, the media guidance application may generate a new display screen including media asset identifiers associated with the indicator that is navigated to, as described in FIG. 3.

Figure 3:
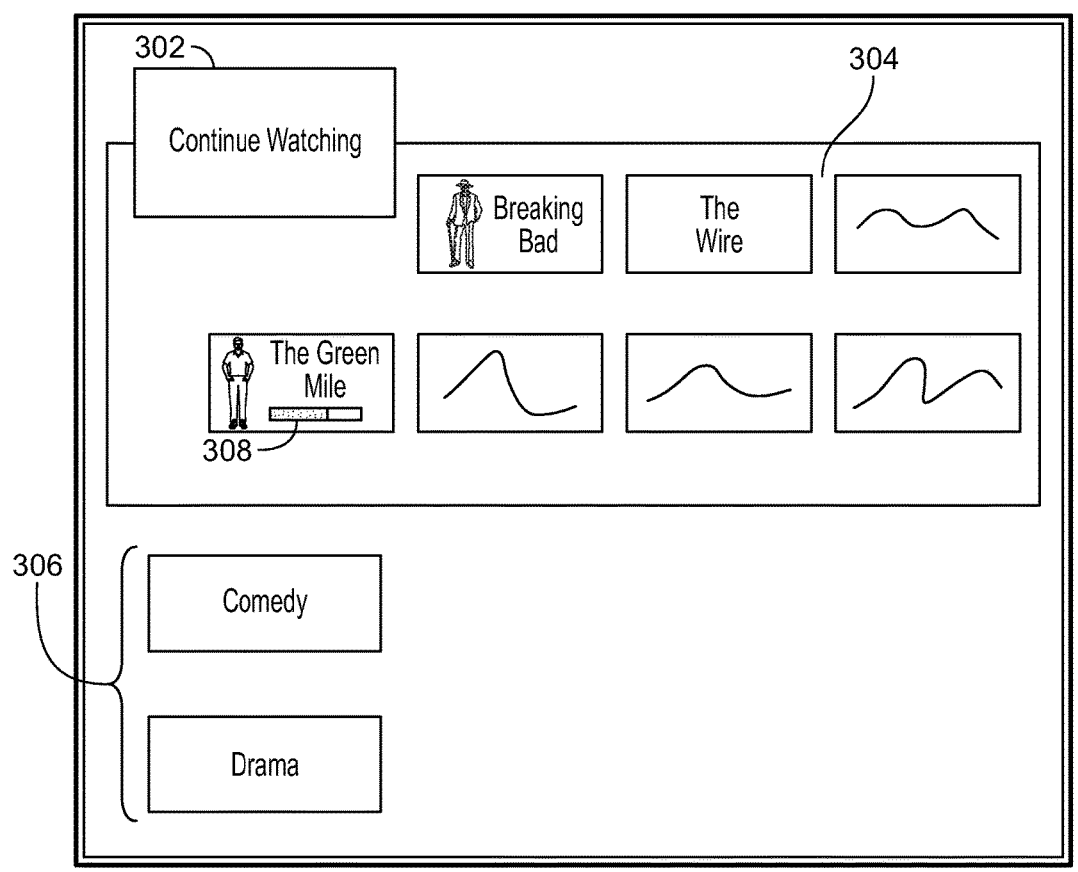
FIG. 3 shows another illustrative example of a display screen with indicators for both groups of media assets and media asset identifiers, in accordance with some embodiments of the disclosure.

FIG. 3 shows another illustrative example of a display screen with indicators for both groups of media assets and media asset identifiers, in accordance with some embodiments of the disclosure. For example, user equipment (e.g., as described further below with respect to FIGS. 6-7) may execute a media guidance application which generates display 300. Display 300 includes groups of media assets 302 and 306. Display 300 also includes media asset identifiers 304 associated with group of media assets 302, which is the group of media assets the media guidance application determined to navigate to based on the received directional navigation commands from the user. Additionally, display 300 may include progress bar 308 for media asset identifiers that a user has partially viewed. Display 300 may appear on one or more user devices.

In some embodiments, the media guidance application may navigate, according to the first direction and the second direction, from a first indicator for the first group of media assets to a second indicator for a second group of media assets. For example, the media guidance application may navigate to the indicator corresponding to the group of media assets (e.g., group of media assets 302) based on the ordered combination of the directions of the two directional navigation commands discussed above with respect to FIG. 2. As a specific example, if the ordered combination of the directions of the two directional navigation commands is to move two indicators down, then the media guidance application may navigate to the indicator corresponding to a second group of media assets two down from the previously selected one (e.g., to "Continue Watching" from "My Shows"). Because the two directional navigation commands were received within the threshold time period of each other, the media guidance application does not generate for display media asset identifiers associated with any of the groups of media assets that were navigated through (e.g., by updating the first display template). One of the advantages of this approach is to save processing time by not loading media asset identifiers that the user is uninterested in. Another advantage of this approach is allowing a user to navigate to a displayed indicator with fewer distractions, since the user quickly entering multiple directional navigation commands indicates a desire to navigate through a number of the displayed indicators. Yet another advantage of this is approach is allowing a user to see more groups of media assets on the display screen by removing media asset identifiers, which may help the user find a group of media assets that he or she is searching for.

In some embodiments, when navigating from a first indicator to a second indicator, the media guidance application may update a flag corresponding to whether a particular indicator is selected. Specifically, the media guidance application may update a first flag of a corresponding third field associated with the first indicator to indicate that the first indicator is no longer selected (e.g., that group of media assets 102, "My Shows," which was previously selected in FIG. 1, is no longer selected). For example, the media guidance application may, in response to determining that the first indicator is no longer selected based on the received directional navigation commands, update the a Boolean value corresponding to the first flag to "false," indicating that the first indicator is no longer selected. The media guidance application may update a second flag of a corresponding third field associated with the second indicator to indicate that the second indicator is selected. For example, the media guidance application may, in response to determining that the second indicator (e.g., corresponding to group of media assets 302) should now be selected based on the received directional navigation commands, update a Boolean value corresponding to the second flag to "true," indicating that the second indicator is now selected.

In some embodiments, when determining which indicator to navigate to responsive to the received directional navigation commands, the media guidance application may determine a number of indicators to navigate through based on a duration that the second directional navigation command was selected. Specifically, the media guidance application may determine a duration associated with the second navigation command. For example, the media guidance application may start a timer when the second directional navigation command is first received and stop the timer when the second directional navigation command ceases to be received. As a specific example, the media guidance application may start the timer when a user depresses a button and stop the timer when the button is no longer depressed. Alternatively or additionally, the media guidance application may determine a clock time when the button was initially depressed (e.g., 10:30:11) and a clock time when the button ceased to be depressed (e.g., 10:30:15) and, by subtracting the two values, determine the duration. As another specific example, the media guidance application may determine a clock time when a virtual button (e.g., a defined range of pixels) on a touchscreen device is initially depressed and a clock time when the virtual button ceases to be depressed.

The media guidance application may compare the duration with a plurality of stored durations, where each of the stored durations corresponds to instructions to a number of indicators to navigate through. For example, the media guidance application may access a data structure containing a plurality of durations and corresponding numbers of indicators (e.g., for groups of media assets) to navigate through. Because the duration measured may be a wide range of values, the media guidance application may round the duration prior to comparing with the data structure, which may only contain discrete values. For example, the media guidance application may determine the duration for a directional navigation command is 3.15 seconds. The media guidance application may round this value to the nearest second (e.g., 3 seconds) prior to comparing with the data structure. In some embodiments, the data structure may contain device-specific corresponding numbers of indicators to navigate through. For example, the media guidance application may, for the same command received for the same duration, retrieve different values for the number of indicators to navigate through for a different device (e.g., a cell phone and a computer). The media guidance application may, based on comparing the duration with a plurality of stored durations, determine the number of indicators to navigate through. For example, the media guidance application may determine that a "DOWN" key was depressed for 3 seconds, which may correspond to navigating through 5 indicators based on the comparison with the data structure. As another example, the media guidance application may determine that a user selected a directional navigation command using a touch-screen interface of a mobile phone for 3 seconds, which may correspond to navigating through 3 indicators based on the comparison with the data structure.

The media guidance application may link media asset identifiers associated with the newly selected second group of media assets to a display template. Specifically, the media guidance application may link a second plurality of media asset identifiers (e.g., corresponding to media asset identifiers 304), instead of the first plurality of media asset identifiers (e.g., corresponding to media asset identifiers 106 in FIG. 1), with the first instance of the first display template, where the second plurality of media asset identifiers is associated with the second group of media assets. For example, the media guidance application may update the first instance of the first display template to reflect that a new group of media assets is selected (e.g., group of media assets 302 instead of group of media assets 102 in FIG. 1). For example, the media guidance application may determine that the group of media assets that was previously ordered three groups below the previously selected group of media assets is now selected based on the two directional navigation commands. The media guidance application may link media asset identifiers associated with the newly selected group of media assets with the first instance of the display template instead of the media asset identifiers that were previously linked (e.g., by clearing pointers to locations in memory that correspond to media asset identifiers in the first instance of the first template and generating and storing new pointers in their place).

The media guidance application may generate for display the first instance of the first display template including a fourth plurality of indicators for the second plurality of media asset identifiers. For example, the media guidance application may generate display 300 including rectangular objects including indicators for the second plurality of media asset identifiers (e.g., media asset identifiers 304), in the same manner as described above for the first plurality of media asset identifiers (e.g., with respect to FIG. 1). In some embodiments, the media guidance application may generate for display, with an indicator, additional information based on data stored in a user profile related to the media asset identifier or group of media assets corresponding to the indicator. For example, if a user has viewed a portion of a media asset (e.g., "The Green Mile") for which an indicator for the corresponding media asset identifier (e.g., one of media asset identifiers 306) is displayed, the media guidance application may add a progress bar (e.g., progress bar 308) to denote the user's progress in the media asset.

In some embodiments, when generating for display the first instance of the first display template including the fourth plurality of indicators for the second plurality of media asset identifiers, the media guidance application may remove groups of media assets that were navigated through. Specifically, the media guidance application may determine a subset of (1) the plurality of groups of media assets and (2) the additional groups of media assets that were not navigated through based on the first directional navigation command and the second directional navigation command. For example, the media guidance application may determine that originally indicators for groups of media assets in the order "My Shows," "May Also Like," and "Continue Watching," were linked to the first instance of the first display template and displayed (e.g., groups of media assets 102 and 104 with respect to FIG. 1). The media guidance application may have added indicators of groups of media assets "Comedy" and "Drama" when the second instance of the second display template was generated for display (e.g., additional groups of media assets 204 are also displayed with groups of media assets 202 with respect to FIG. 2). If, based on the received directional navigation commands, the media guidance application navigates to "Continue Watching," then group of media assets "May Also Like" was navigated through. Thus, groups "My Shows," "Continue Watching," "Comedy," and "Drama" were not navigated through and comprise the subset. In some embodiments, the initial selected group is included as being navigated through, in which case groups "Continue Watching," "Comedy," and "Drama" were not navigated through (or initially selected) and comprise the subset.

The media guidance application may remove links in the first instance of the first display template to the plurality of groups of media assets. For example, if the subset comprises groups "Continue Watching," "Comedy," and "Drama" and groups "My Shows," "May Also Like," and "Continue Watching" are linked in the first instance of the first display template, then the media guidance application removes the links to groups "My Shows" and "May Also Like," as they have been navigated through. The media guidance application may link the subset with the first instance of the first display template. For example, the media guidance application may replace the removed links to groups of media assets "My Shows" and "May Also Like" with groups of media assets "Comedy" and "Drama". The media guidance application may generate for display a fifth plurality of indicators for the subset. For example, the media guidance application may generate, with the fourth plurality of indicators, indicators for the groups of media assets that are part of the subset of groups of media assets (e.g., groups of media assets 306). In this way, the media guidance application does not generate for display groups of media assets that the user has already seen and chosen to navigate through.

In some embodiments, the media guidance application may determine a group of media assets to navigate to based on a sequence of user input received within a threshold time period. By utilizing a plurality of different sequences, a user can navigate quickly through groups of media assets more precisely and save time finding a category that he or she is looking for. Specifically, the media guidance application may receive a third directional navigation command within the threshold time period from when the second directional navigation command is received. For example, upon receiving the second directional navigation command the media guidance application may start a timer for the threshold period of time (e.g., 0.5 seconds). In some embodiments, the threshold period of time may be different depending on the previously received directional navigation command and/or the number of previously received directional navigation commands. The media guidance application may monitor for additional user input corresponding to a third directional navigation command (e.g., another user input of the "DOWN" button on a remote control). The media guidance application may monitor user input and determine that a user has completed a navigation sequence before or after generating the second instance of the second display template for display and/or without generating for display one or both of the second display template (e.g., FIG. 2) or the first display template (FIG. 3). For example, the media guidance application may receive a plurality of user inputs and, instead of generating for display the second navigation template, navigate based on the matched navigation sequence. In another example, the media guidance application may determine the first and second received user inputs from the user correspond to directional navigation commands and complete a stored navigation sequence. The media guidance application may navigate according to an associated instruction, as described below.

The media guidance application may compare the third directional navigation command with each initial directional navigation command associated with each navigation sequence of a plurality of stored navigation sequences, where each navigation sequence comprises a series of ordered directional navigation commands. For example, the media guidance application may access a data structure containing navigation sequences, stored either locally in memory or remotely at a server accessible via a communications network, and compare the received third directional navigation command with the first navigation command of each stored navigation sequence in the data structure. The media guidance application may determine based on the comparing, that the third directional navigation command is an initial directional navigation command for one or more stored navigation sequences. For example, the media guidance application may determine that the initial directional navigation command for one or more of the stored navigation sequences in the data structure corresponds to the third directional navigation command received from the user.

The media guidance application, in response to determining that the third directional navigation command is the initial directional navigation command for one or more stored navigation sequences may receive at least one subsequent directional navigation command, where each subsequent directional navigation command of the at least one subsequent directional navigation command is received within a threshold time from when an immediately preceding directional navigation command was received. For example, the media guidance application may receive a fourth directional navigation command from the user within the threshold period of time of the third directional navigation command. The media guidance application may continue to monitor for subsequent directional navigation commands until a directional navigation command is not received within the threshold time of the previous received directional navigation command.

The media guidance application may compare the at least one subsequent directional navigation command with remaining directional navigation commands of the one or more stored navigation sequences. For example, the media guidance application may compare the directional navigation commands, in the order that they were received, with directional navigation commands of navigation sequences that matched the third directional navigation command to determine if the subsequently received directional navigation commands complete any navigation sequences. The media guidance application may determine, based on the at least one subsequent directional navigation command matching the remaining directional navigation commands for a navigation sequence of the one or more navigation sequences, that the at least one subsequent directional navigation command completes the navigation sequence. For example, if the media guidance application receives four additional "DOWN" commands and a navigation sequence is completed by four additional "DOWN" commands, then the media guidance application may determine that the sequence matches the received input.

The media guidance application may navigate, based on an instruction associated with the completed navigation sequence, from the second indicator for the second group of media assets to a third indicator for a third group of media assets. For example, the media guidance application may retrieve a stored instruction associated with the completed navigation sequence from a field in a data structure. The media guidance application may determine, based on the instruction, a number of indicators to navigate through and a direction to navigate. In some embodiments, the instruction may contain multiple directions and numbers of indicators to navigate through in a particular order (e.g., if the indicators are arranged in a grid of rows and columns). As a specific example, an instruction for four "DOWN" commands received in a row may be to navigate to the indicator eight indicators down from the currently selected indicator. In response, the media guidance application may navigate to the indicator eight below the current indicator and update the first instance of the first display template, as described above.

In some embodiments, a user may enter a navigation sequence multiple times, or once with a portion of the navigation sequence reentered. In this instance, the particular sequence may not be stored, but the media guidance application may adjust the instruction associated with the navigation sequence. Specifically, the media guidance application may determine that the at least one subsequent directional navigation command includes additional commands after the completed navigation sequence. For example, the media guidance application may determine that after matching a navigation sequence that requires four "DOWN" commands, the user also input an additional two "DOWN" commands. The media guidance application may determine whether the additional received commands correspond to a portion of the completed navigation sequence. For example, the media guidance application may determine that since two "DOWN" commands correspond to two commands in the matched sequence, they correspond to a portion of the completed navigation sequence. In some embodiments, the media guidance application may determine whether a threshold number of commands are matched in order to determine that a portion of the navigation sequence is matched. For example, the media guidance application may determine that two additional "DOWN" commands do not correspond to any adjustment to the instruction, but four "DOWN" commands would (e.g., if the threshold is three additional commands matching a portion of the navigation sequence).

The media guidance application may, in response to determining that the additional commands correspond to the portion of the completed navigation sequence, adjust the instruction associated with the completed navigation sequence. For example, the media guidance application may, based on a predefined rule-set for the number of additional commands match to the navigation sequence, determine to adjust the instruction. For example, the media guidance application may determine that, if three additional "DOWN" commands are received, to increase the number of indicators that are navigated through by three from the number indicated in the instruction associated with the navigation sequence. The media guidance application may navigate, based on the adjusted instruction, to a fourth indicator for a fourth group of media assets. For example, if the instruction was to navigate to an indicator eight below the currently selected indicator, the media guidance application may navigate to the indicator eleven below, based on the adjusted instruction.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
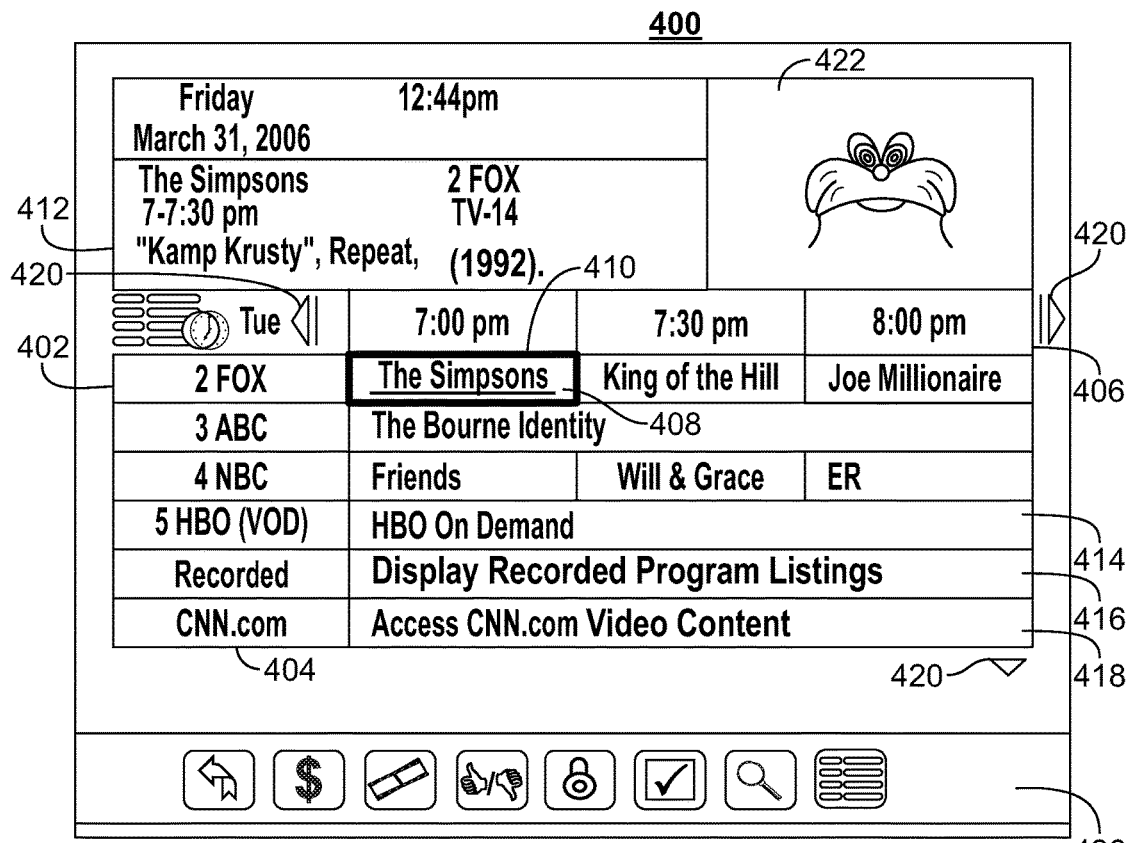
FIG. 4 shows an illustrative example of a display screen for use in accessing media content in accordance with some embodiments of the disclosure.
Figure 5:
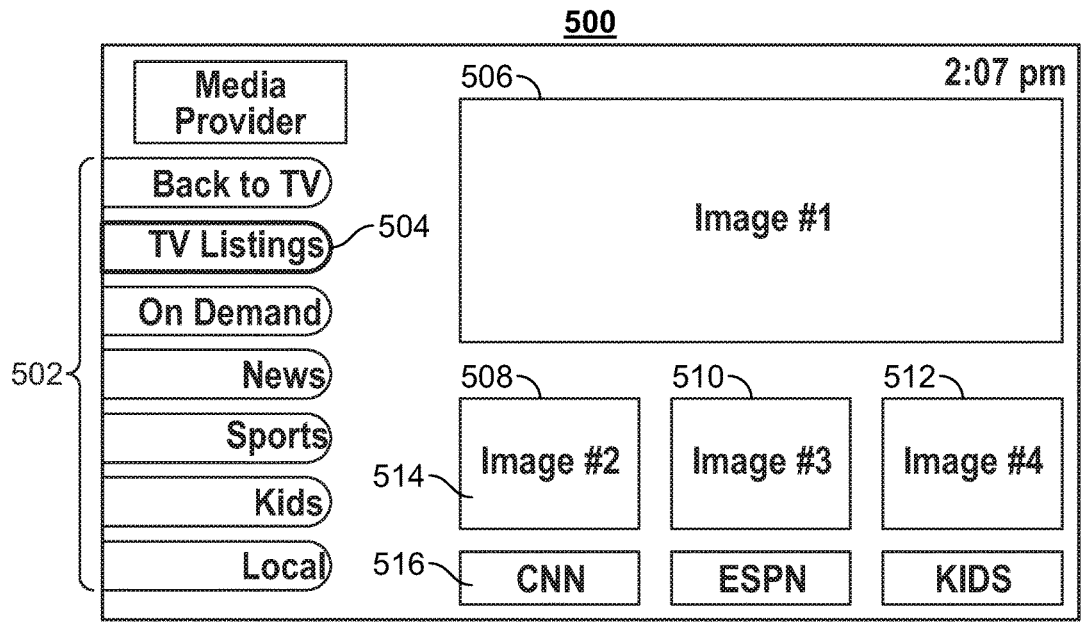
FIG. 5 shows another illustrative example of a display screen for use in accessing media content in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
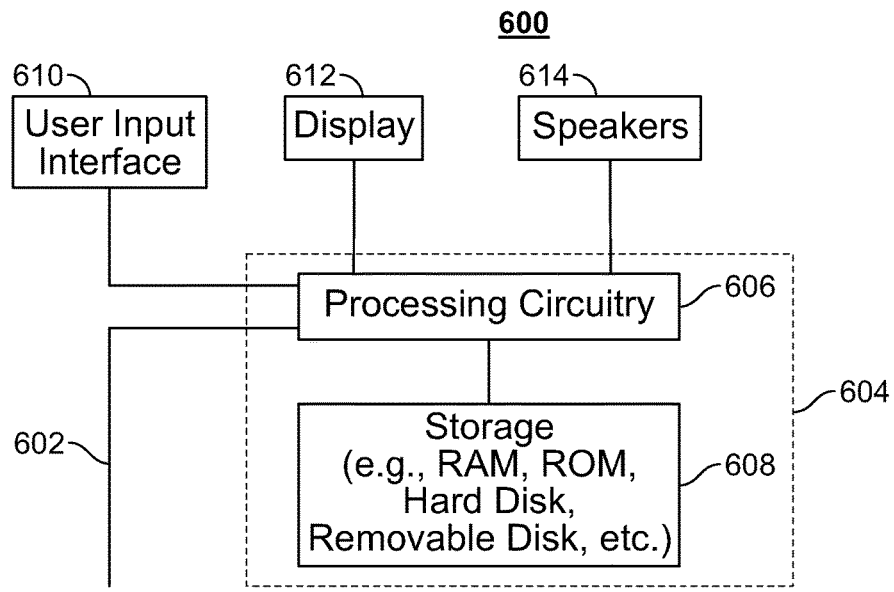
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
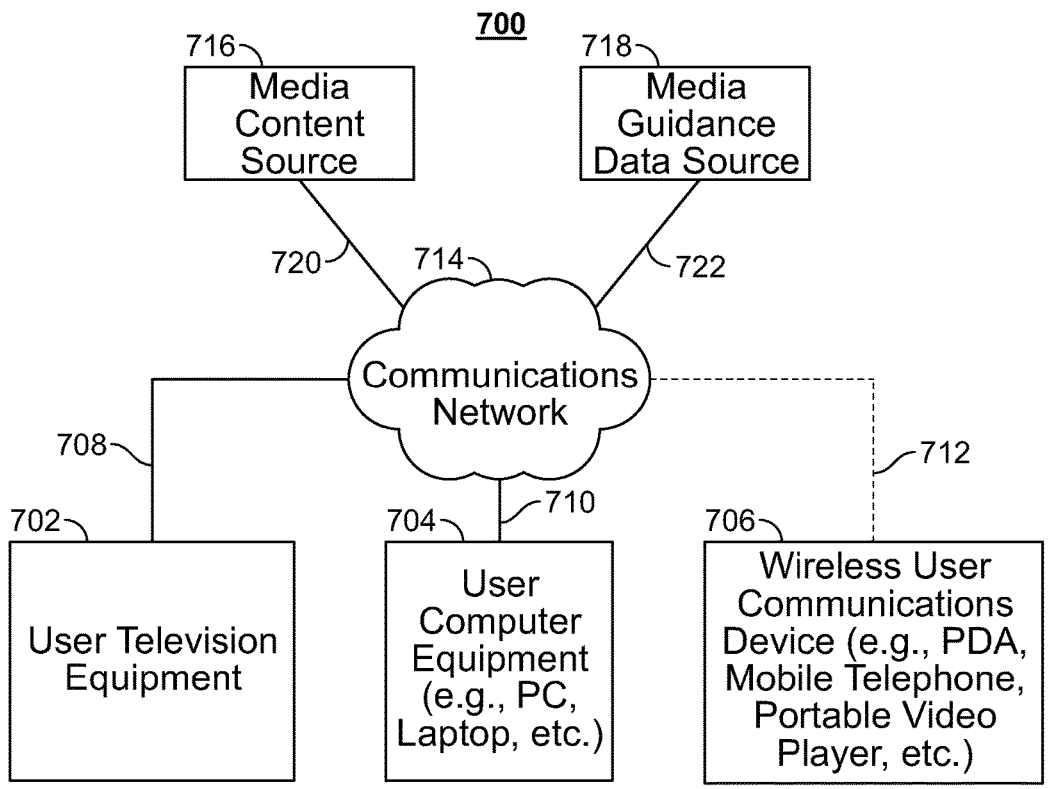
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
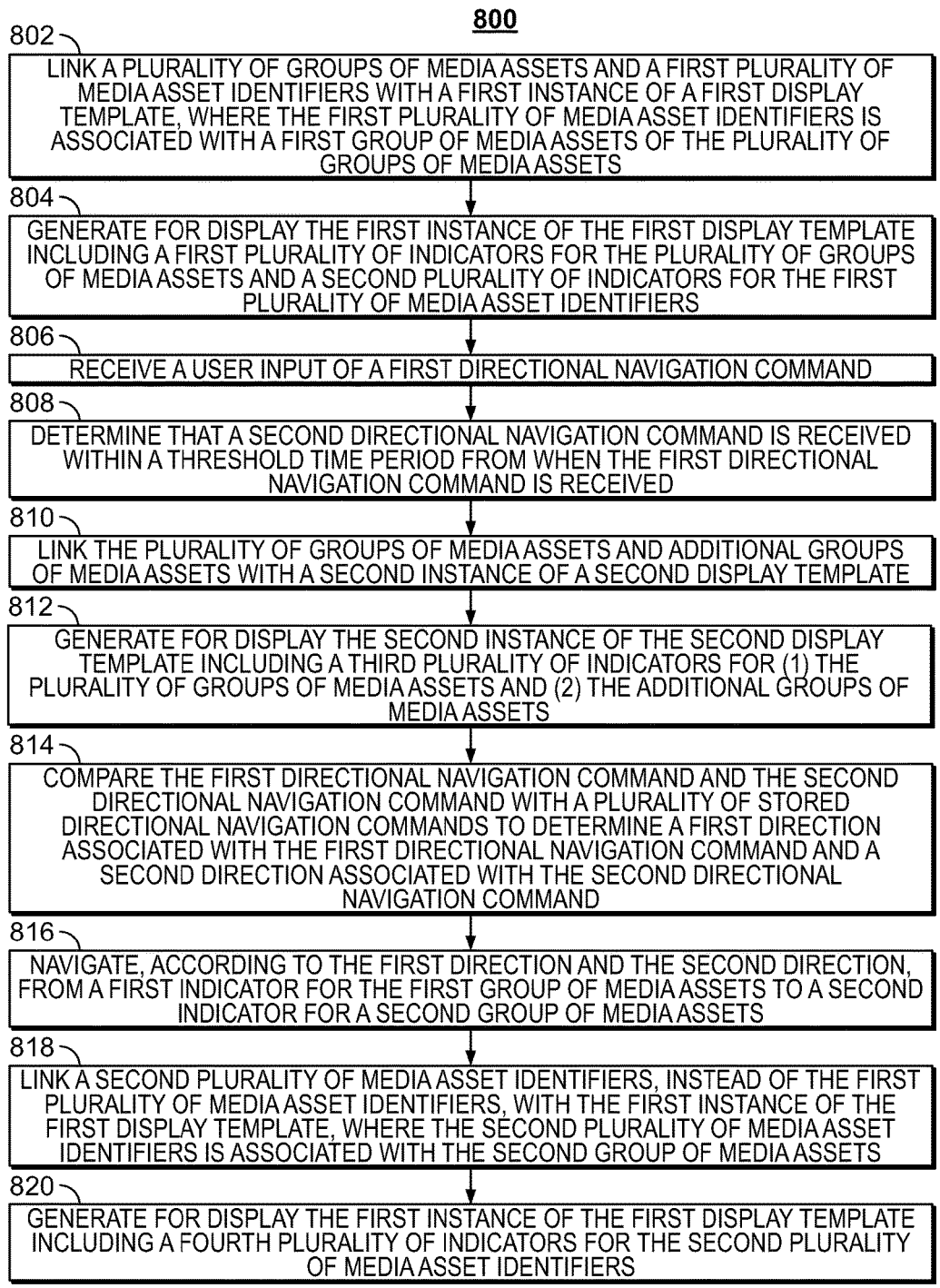
FIG. 8 is a flowchart of illustrative actions for navigating between groups of media assets, in accordance with some embodiments of the disclosure.

FIG. 8 is a flowchart of illustrative actions for navigating between groups of media assets, in accordance with some embodiments of the disclosure. For example, a media guidance application implementing process 800 may be executed by control circuitry 604 (FIG. 6). It should be noted that process 800 or any action thereof could be performed on, or provided by, any of the devices shown in FIGS. 6-7.

Process 800 begins at 802, where the media guidance application links (e.g., via control circuitry 604 (FIG. 6)) a plurality of groups of media assets and a first plurality of media asset identifiers with a first instance of a first display template, where the first plurality of media asset identifiers is associated with a first group of media assets of the plurality of groups of media assets. For example, the media guidance application may retrieve, either locally from storage (e.g., storage 608 (FIG. 6)) or remotely from a server (e.g., media guidance data source 718 (FIG. 7)) via a communications network (e.g., communications network 714 (FIG. 7)), the first display template. The first display template may be any suitable data structure, such as a class or a table that contains parameters for displaying groups of media assets and media asset identifiers. The media guidance application may generate (e.g., storage 608 (FIG. 6)) a first instance of the first display template. The media guidance application may store (e.g., storage 608 (FIG. 6)) links to particular locations in storage (e.g., pointers) for the particular groups of media assets and media asset identifiers to be displayed. For example, each group of media assets may be an object which has a plurality of associated media assets. As a specific example, a group of media assets may be for the genre, "Comedy," which may be associated with media assets such as "Happy Gilmore."

Process 800 continues to 804, where the media guidance application generates (e.g., via control circuitry 604 (FIG. 6)) for display (e.g., on display 612 (FIG. 6)) the first instance of the first display template including a first plurality of indicators for the plurality of groups of media assets and a second plurality of indicators for the first plurality of media asset identifiers. For example, the media guidance application may generate (e.g., via control circuitry 604 (FIG. 6)) for display (e.g., on display 612 (FIG. 6)) rectangular objects of a first size including identifiers for the first plurality of groups of media assets and rectangular objects of a second size including identifiers for the first plurality of media asset identifiers. The media guidance application may generate (e.g., via control circuitry 604 (FIG. 6)) each indicator based on formatting instructions for the indicator. For example, if one indicator corresponds to a media asset identifier with a long title, then the media guidance application may generate (e.g., via control circuitry 604 (FIG. 6)) the indicator to be larger than other indicators.

Process 800 continues to 806, where the media guidance application receives (e.g., via control circuitry 604 (FIG. 6)) a user input (e.g., via user input interface 610 (FIG. 6)) of a first directional navigation command. For example, the media guidance application may receive (e.g., via control circuitry 604 (FIG. 6)) a user input via a user input interface (e.g., via user input interface 610 (FIG. 6)), such as a remote control. The media guidance application may determine (e.g., via control circuitry 604 (FIG. 6)) whether the user input corresponds to a directional navigation command (e.g., navigating in the down direction with a "DOWN" button) or a different command (e.g., to enter a VOD menu with a "VOD" button) based on comparing the received user input with a stored list of commands associated with particular user inputs.

Process 800 continues to 808, where the media guidance application determines (e.g., via control circuitry 604 (FIG. 6)) that a second directional navigation command is received within a threshold time period from when the first directional navigation command is received. For example, upon receiving the first directional navigation command, the media guidance application may start (e.g., via control circuitry 604 (FIG. 6)) a timer for the threshold period of time (e.g., 0.5 seconds). The media guidance application may monitor (e.g., via control circuitry 604 (FIG. 6)) for additional user input corresponding to a second directional navigation command (e.g., another user input of the "DOWN" button on a remote control).

Process 800 continues to 810, where the media guidance application links (e.g., via control circuitry 604 (FIG. 6)) the plurality of groups of media assets and additional groups of media assets with a second instance of a second display template. For example, in order to fill the screen, since no media asset identifiers are generated with the second display template, the media guidance application may add (e.g., via control circuitry 604 (FIG. 6)) additional groups of media assets that may allow the user to see more groups of media assets at a time for easier navigation. For example, the media guidance application may store (e.g., via control circuitry 604 (FIG. 6)) pointers to locations in storage (e.g., storage 608 (FIG. 6)) of identifiers for the plurality of groups of media assets and identifiers for the additional groups of media assets in fields of an instance of the second display template, similar to as described above with respect to step 802 and FIG. 1 for generating and storing pointers in the instance of the first display template.

Process 800 continues to 812, where the media guidance application generates (e.g., via control circuitry 604 (FIG. 6)) for display (e.g., on display 612 (FIG. 6)) the second instance of the second display template including a third plurality of indicators for (1) the plurality of groups of media assets and (2) the additional groups of media assets. For example, the media guidance application may generate (e.g., via control circuitry 604 (FIG. 6)) for display rectangular objects including identifiers (e.g., a title) of each of both the plurality of groups of media assets and the additional groups of media assets. The media guidance application may generate (e.g., via control circuitry 604 (FIG. 6)) each indicator based on formatting instructions for the indicator. For example, if one indicator corresponds to a group of media assets with a large image, the media guidance application (e.g., via control circuitry 604 (FIG. 6)) may generate the indicator to be larger than other indicators. Alternatively, the media guidance application may scale (e.g., via control circuitry 604 (FIG. 6)) the image such that it fits in its entirety in a same-sized indicator as other displayed indicators.

Process 800 continues to 814, where the media guidance application compares (e.g., via control circuitry 604 (FIG. 6)) the first directional navigation command and the second directional navigation command with a plurality of stored directional navigation commands to determine a first direction associated with the first directional navigation command and a second direction associated with the second directional navigation command. For example, the media guidance application may receive (e.g., via control circuitry 604 (FIG. 6)) a first directional navigation command of a "DOWN" button (e.g., via user input interface 610 (FIG. 6)) and determine that the command corresponds to a request to move down (the first direction) to the next group of media assets that is displayed. The media guidance application may determine (e.g., via control circuitry 604 (FIG. 6)) that the second received command, e.g., also of the "DOWN" button, is to move down (the second direction) one additional group of media assets. The media guidance application may determine (e.g., via control circuitry 604 (FIG. 6)) the direction and type of command by comparing each received command with a plurality of stored commands in a database, which may be local (e.g., storage 608 (FIG. 6)) or remote (e.g., at media guidance data source 718 accessible via communications network 714 (FIG. 7)) from the media guidance application.

Process 800 continues to 816, where the media guidance application navigates (e.g., via control circuitry 604 (FIG. 6)), according to the first direction and the second direction, from a first indicator for the first group of media assets to a second indicator for a second group of media assets. For example, the media guidance application may navigate (e.g., via control circuitry 604 (FIG. 6)) to the indicator corresponding to the group of media assets based on the ordered combination of the directions of the two directional navigation commands. For example, if the ordered combination of the directions of the two directional navigation commands is to move two indicators down, then the media guidance application may navigate (e.g., via control circuitry 604 (FIG. 6)) to the indicator corresponding to a second group of media assets two down from the previously selected one.

Process 800 continues to 818, where the media guidance application links (e.g., via control circuitry 604 (FIG. 6)) a second plurality of media asset identifiers, instead of the first plurality of media asset identifiers, with the first instance of the first display template, where the second plurality of media asset identifiers is associated with the second group of media assets. For example, the media guidance application may update (e.g., via control circuitry 604 (FIG. 6)) the first instance of the first display template to reflect that a new group of media assets is selected. For example, the media guidance application may determine (e.g., via control circuitry 604 (FIG. 6)) that the group of media assets that was previously ordered three below the previously selected group of media assets is now selected based on the two directional navigation commands. The media guidance application may link (e.g., via control circuitry 604 (FIG. 6)) media asset identifiers associated with the newly selected group of media assets with the first instance of the display template instead of the media asset identifiers that were previously linked (e.g., by clearing pointers to locations in memory that correspond to media asset identifiers in the first instance of the first template and generating and storing new pointers in their place).

Process 800 continues to 820, where the media guidance application generates (e.g., via control circuitry 604 (FIG. 6)) for display (e.g., on display 612 (FIG. 6)) the first instance of the first display template including a fourth plurality of indicators for the second plurality of media asset identifiers. For example, the media guidance application may generate (e.g., via control circuitry 604 (FIG. 6)) for display (e.g., on display 612 (FIG. 6)) rectangular objects including identifiers for the second plurality of media asset identifiers, in the same manner as described above with respect to step 804 and FIG. 1 for the first plurality of media asset identifiers.

It is contemplated that the steps or descriptions of each of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 8.

Figure 9:
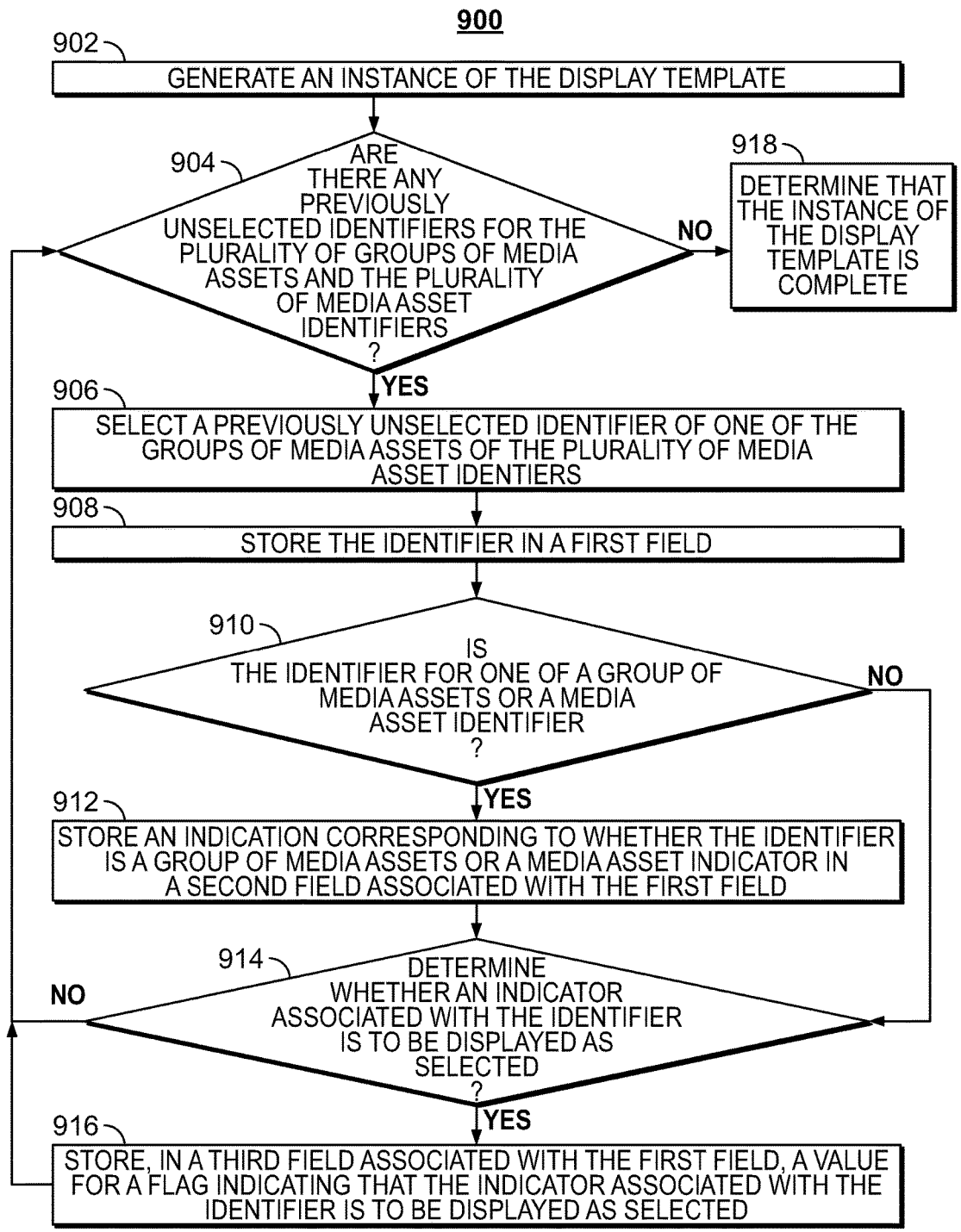
FIG. 9 is a flowchart of illustrative actions for linking a plurality of groups of media assets and a plurality of media asset identifiers with an instance of a display template, in accordance with some embodiments of the disclosure.

FIG. 9 is a flowchart of illustrative actions for linking a plurality of groups of media assets and a plurality of media asset identifiers with an instance of a display template, in accordance with some embodiments of the disclosure. For example, a media guidance application implementing process 900 may be executed by control circuitry 604 (FIG. 6) to link a plurality of groups of media assets and a plurality of media asset identifiers with an instance of a display template. Specifically, the media guidance application may initialize the necessary variables and execute (e.g., via control circuitry 604 (FIG. 6)) a program script calling a particular method to execute process 900. It should be noted that process 900 or any step thereof could be performed on, or provided by, any of the devices shown in FIGS. 6-7.

Process 900 begins at 902, where the media guidance application generates (e.g., via control circuitry 604 (FIG. 6)) an instance of the display template. For example, the media guidance application may generate (e.g., via control circuitry 604 (FIG. 6)), based on the display template, a data structure containing a plurality of fields. The data structure may be organized as a table, where each row in the table corresponds to an indicator to be displayed, and each field contains information relating to the indicator. Alternatively, the data structure may be organized as an object of a class, where the class contains attributes for each indicator corresponding to the first display template. The media guidance application may execute (e.g., via control circuitry 604 (FIG. 6)) an instruction to create an object (e.g., the first instance) of the class (e.g., the first display template) and define the attributes for each indicator.

Process 900 continues to 904, where the media guidance application determines (e.g., via control circuitry 604 (FIG. 6)) if there are any previously unselected identifiers for the plurality of groups of media assets and the plurality of media asset identifiers. For example, the media guidance application may determine (e.g., via control circuitry 604 (FIG. 6)), based on the instance of the display template, whether each indicator defined in the display template has been linked to a particular identifier of a group of media assets or media asset identifier. The media guidance application may execute (e.g., via control circuitry 604 (FIG. 6)) a for-loop to link each indicator defined in the template with an identifier. Alternatively or additionally, the media guidance application may determine (e.g., via control circuitry 604 (FIG. 6)) a set of identifiers that should be generated for display and write (e.g., via control circuitry 604 (FIG. 6)) instructions for generating each identifier for display (e.g., an indicator) to the instance of the display template (e.g., also using a for-loop to iteratively write instructions for indicators corresponding to each identifier). If, at step 904, the media guidance application determines (e.g., via control circuitry 604 (FIG. 6)) that there are no more previously unselected identifiers, then process 900 continues to 918, where the media guidance application (e.g., via control circuitry 604 (FIG. 6)) determines that the instance of the display template is complete. For example, after every identifier determined to be displayed is linked to the instance of the display template, the media guidance application may terminate (e.g., via control circuitry 604 (FIG. 6)) process 900.

If, at step 904, the media guidance application determines (e.g., via control circuitry 604 (FIG. 6)) that there are previously unselected identifiers, process 900 continues to 906, where the media guidance application selects (e.g., via control circuitry 604 (FIG. 6)) a previously unselected identifier of one of the groups of media assets of the plurality of media asset identifiers. For example, the media guidance application may retrieve (e.g., via control circuitry 604 (FIG. 6)) an identifier that has not been previously retrieved and store instructions for generating for display an indicator corresponding to the identifier in the instance of the display template. Specifically, the media guidance application may, based on an iterator, select (e.g., via control circuitry 604 (FIG. 6)) the next entry for an identifier in a data structure including a plurality of identifiers.

Process 900 continues to 908, where the media guidance application stores (e.g., via control circuitry 604 (FIG. 6)) the identifier in a first field. For example, the media guidance application may generate (e.g., via control circuitry 604 (FIG. 6)) pointers to locations in memory (e.g., storage 608 (FIG. 6)) containing data associated with a group of media assets or a media asset identifier and store respective pointers in the first field for each indicator. For example, the media guidance application may generate (e.g., via control circuitry 604 (FIG. 6)) a pointer to a location in memory containing a title, pixel information for an image, or any other associated data that may be used to identify the group of media assets or media asset identifier. Alternatively or additionally, the media guidance application may store (e.g., via control circuitry 604 (FIG. 6)) a URL or other identifier in the first field that defines a location remote from the media guidance application containing the data associated with a group of media assets or a media asset identifier as described above.

Process 900 continues to 910, where the media guidance application determines (e.g., via control circuitry 604 (FIG. 6)) whether the identifier is for one of a group of media assets or a media asset identifier. For example, for each stored identifier, the media guidance application determines (e.g., via control circuitry 604 (FIG. 6)), based on metadata associated with the identifier, whether it is a group of media assets, media asset identifier, or other. Specifically, the identifier may be associated with a flag or other stored indication indicating a type of identifier, which the media guidance application may retrieve (e.g., via control circuitry 604 (FIG. 6)) to determine whether the identifier is for a group of media assets or media asset identifier.

If, at step 910, the media guidance application determines (e.g., via control circuitry 604 (FIG. 6)) that the identifier is for a group of media assets or a media asset identifier, then process 900 continues to 912, where the media guidance application stores (e.g., via control circuitry 604 (FIG. 6)) an indication corresponding to whether the identifier is a group of media assets or a media asset indicator in a second field associated with the first field. For example, the media guidance application may store (e.g., via control circuitry 604 (FIG. 6)) a single character, string of characters, or integer indicating whether an identifier stored in a first field corresponds to a group of media assets or a media asset identifier. For example, if media asset identifiers and groups of media assets are the only types of identifiers, a single flag may be stored by the media guidance application (e.g., via control circuitry 604 (FIG. 6)) indicating whether the corresponding identifier is a group of media assets (e.g., set to "true"). After storing the indication, process 900 continues to 914, as described further below.

If, at step 910, the media guidance application determines (e.g., via control circuitry 604 (FIG. 6)) that the identifier is not for a group of media assets or a media asset identifier, then process 900 continues to 914, where the media guidance application determines (e.g., via control circuitry 604 (FIG. 6)) whether an indicator associated with the identifier is to be displayed as selected. For example, the media guidance application may determine (e.g., via control circuitry 604 (FIG. 6)) that a particular group of media assets or media asset identifier was navigated to and thus was selected. If, at step 914, the media guidance application determines (e.g., via control circuitry 604 (FIG. 6)) that an indicator is not to be displayed as selected, process 900 returns to 904, where the media guidance application determines (e.g., via control circuitry 604 (FIG. 6)) if there are any previously unselected identifiers for the plurality of groups of media assets and the plurality of media asset identifiers, as described above.

If, at step 914, the media guidance application determines (e.g., via control circuitry 604 (FIG. 6)) that an indicator associated with the identifier is to be displayed as selected, process 900 continues to 916, where the media guidance application stores (e.g., via control circuitry 604 (FIG. 6)), in a third field associated with the first field, a value for a flag indicating that the indicator associated with the identifier is to be displayed as selected. For example, the media guidance application may set (e.g., via control circuitry 604 (FIG. 6)) the flag in the third field corresponding to the appropriate identifier stored in the first field to "true." After storing the value for the flag, process 900 returns to 904, where the media guidance application determines (e.g., via control circuitry 604 (FIG. 6)) if there are any previously unselected identifiers for the plurality of groups of media assets and the plurality of media asset identifiers, as described above.

Figure 10:
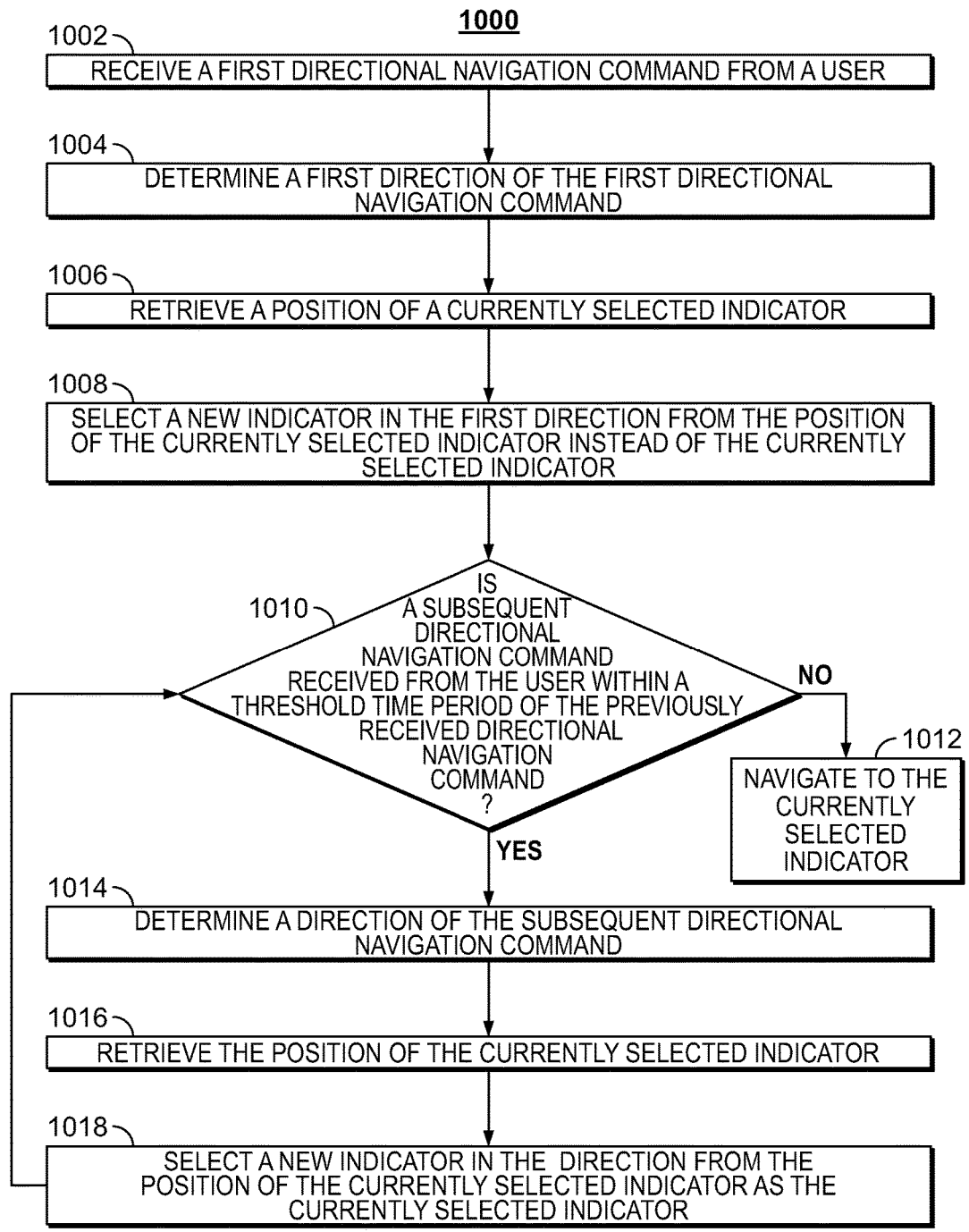
FIG. 10 is a flowchart of illustrative actions for navigating, according to directions corresponding to received user directional navigation commands, from a first indicator for a first group of media assets to a second indicator for a second group of media assets, in accordance with some embodiments of the disclosure.

FIG. 10 is a flowchart of illustrative actions for navigating, according to directions corresponding to received user directional navigation commands, from a first indicator for a first group of media assets to a second indicator for a second group of media assets, in accordance with some embodiments of the disclosure. For example, a media guidance application implementing process 1000 may be executed by control circuitry 604 (FIG. 6) to navigate, according to directions corresponding to received user directional navigation commands, from a first indicator for a first group of media assets to a second indicator for a second group of media assets. Specifically, the media guidance application may initialize the necessary variables and execute (e.g., via control circuitry 604 (FIG. 6)) a program script calling a particular method to execute process 1000. It should be noted that process 1000 or any step thereof could be performed on, or provided by, any of the devices shown in FIGS. 6-7.

Process 1000 begins at 1002, where the media guidance application receives (e.g., via control circuitry 604 (FIG. 6)) a first directional navigation command from a user. For example, the media guidance application may receive (e.g., via control circuitry 604 (FIG. 6)) a user input via a user input interface (e.g., via user input interface 610 (FIG. 6)), such as a remote control. The media guidance application may determine (e.g., via control circuitry 604 (FIG. 6)) whether the user input corresponds to a directional navigation command (e.g., navigating in the down direction with a "DOWN" button) or a different command (e.g., to enter a VOD menu with a "VOD" button) based on comparing the received user input with a stored list of commands associated with particular user inputs.

It is contemplated that the steps or descriptions of each of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 9.

Process 1000 continues to 1004, where the media guidance application determines (e.g., via control circuitry 604 (FIG. 6)) a first direction of the first directional navigation command. For example, the media guidance application may receive (e.g., via control circuitry 604 (FIG. 6)) a first directional navigation command of a "DOWN" button and determine that the command corresponds to a request to move down (the first direction) to the next group of media assets that is displayed.

Process 1000 continues to 1006, where the media guidance application retrieves (e.g., via control circuitry 604 (FIG. 6)) a position of a currently selected indicator. For example, the media guidance application may search (e.g., via control circuitry 604 (FIG. 6)) a data structure for an indication (e.g., a Boolean value set to true) of which indicator is currently selected. The media guidance application may, upon determining the currently selected indicator, retrieve (e.g., via control circuitry 604 (FIG. 6)) the position of the selected indicator on the screen from data (e.g., coordinates) associated with the indicator.

Process 1000 continues to 1008, where the media guidance application selects (e.g., via control circuitry 604 (FIG. 6)) a new indicator in the first direction from the position of the currently selected indicator instead of the currently selected indicator. For example, based on the position of the currently selected indicator and the direction of the first directional navigation command, the media guidance application selects (e.g., via control circuitry 604 (FIG. 6)) a new indicator to be displayed (e.g., by setting a Boolean value associated with the indicator to "true" for the new indicator).

Process 1000 continues to 1010, where the media guidance application determines (e.g., via control circuitry 604 (FIG. 6)) if there is a subsequent directional navigation command received from the user (e.g., via user input interface 610 (FIG. 6)) within a threshold time period of the previously received directional navigation command. For example, upon receiving a directional navigation command the media guidance application may start (e.g., via control circuitry 604 (FIG. 6)) a timer for the threshold period of time (e.g., 5 seconds). The media guidance application may monitor (e.g., via control circuitry 604 (FIG. 6)) for additional user input (e.g., via user input interface 610 (FIG. 6)) corresponding to another directional navigation command (e.g., another user input of the "DOWN" button on a remote control). If a subsequent directional navigation command is not received within the threshold time period, process 1000 continues to 1012, where the media guidance application navigates (e.g., via control circuitry 604 (FIG. 6)) to the currently selected indicator. For example, based on receiving no further directional navigation commands within the threshold time, the media guidance application may determine (e.g., via control circuitry 604 (FIG. 6)) that the user has selected the indicator he or she wishes to see more information for. Accordingly, the media guidance application may navigate (e.g., via control circuitry 604 (FIG. 6)) to the currently selected indicator (e.g., based on the stored flag) and generate (e.g., via control circuitry 604 (FIG. 6)) for display (e.g., on display 612 (FIG. 6)) media asset identifiers associated with the selected indicator (e.g., as described above with respect to FIG. 3).

If another directional navigation command is received within the threshold time period, process 1000 continues to 1014, where the media guidance application determines (e.g., via control circuitry 604 (FIG. 6)) a direction of the subsequent directional navigation command. For example, as described above with respect to step 1004, the media guidance application may receive (e.g., via control circuitry 604 (FIG. 6)) a directional navigation command of a "DOWN" button and determine that the command corresponds to a request to move down (another direction) to the next group of media assets that is displayed.

Process 1000 continues to 1016, where the media guidance application retrieves (e.g., via control circuitry 604 (FIG. 6)) the position of the currently selected indicator. For example, as discussed above with respect to 1006, the media guidance application may search (e.g., via control circuitry 604 (FIG. 6)) a data structure for an indication (e.g., a Boolean value set to true) of which indicator is currently selected. The media guidance application may, upon determining the currently selected indicator, retrieve (e.g., via control circuitry 604 (FIG. 6)) the position of the selected indicator on the screen from data (e.g., coordinates) associated with the indicator.

Process 1000 continues to 1018, where the media guidance application selects (e.g., via control circuitry 604 (FIG. 6)) a new indicator in the direction from the position of the currently selected indicator as the currently selected indicator. For example, as described above with respect to 1008, based on the position of the currently selected indicator and the direction of the most recently received directional navigation command, the media guidance application selects (e.g., via control circuitry 604 (FIG. 6)) a new indicator to be displayed (e.g., by setting a Boolean value associated with the indicator to "true" for the new indicator). Process 1000 returns to 1010 to determine (e.g., via control circuitry 604 (FIG. 6)) whether another directional navigation command was received from the user within the threshold time period of the previously received directional navigation command. In this way, the media guidance application selects (e.g., via control circuitry 604 (FIG. 6)), but does not navigate to or display, indicators based on a series of received user directional navigation commands within a threshold time of the previously received command. Once a command is not received within the threshold time, then the media guidance application navigates (e.g., via control circuitry 604 (FIG. 6)) to the currently selected indicator, as discussed above with respect to FIGS. 1-3 and 8 above.

It is contemplated that the steps or descriptions of each of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 10.

Figure 11:
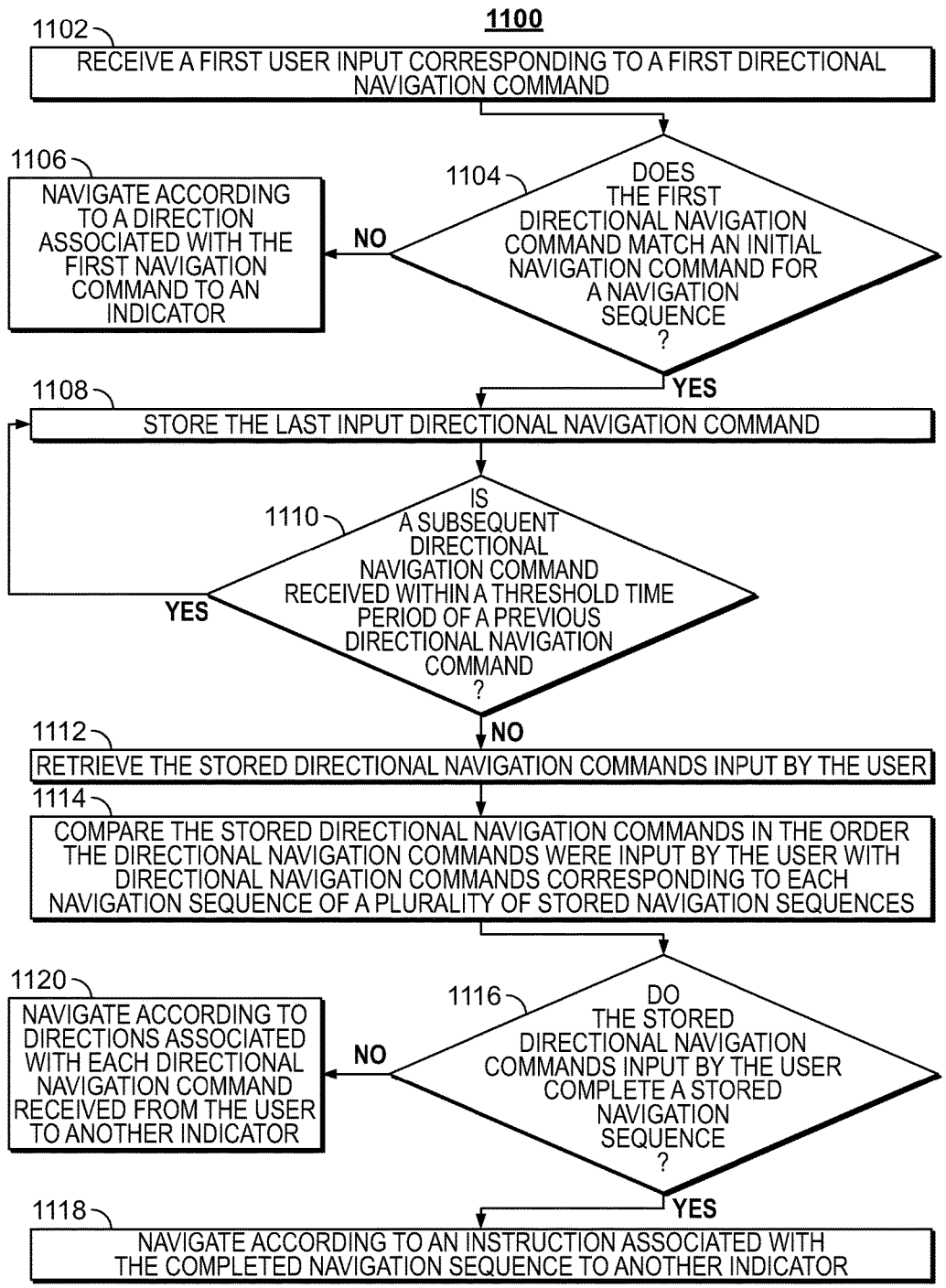
FIG. 11 is a flowchart of illustrative actions for determining whether received user inputs correspond to a navigation sequence, in accordance with some embodiments of the disclosure.

FIG. 11 is a flowchart of illustrative actions for determining whether received user inputs correspond to a navigation sequence, in accordance with some embodiments of the disclosure. For example, a media guidance application implementing process 1100 may be executed by control circuitry 604 (FIG. 6) to determine whether received user inputs correspond to a navigation sequence. Specifically, the media guidance application may initialize the necessary variables and execute (e.g., via control circuitry 604 (FIG. 6)) a program script calling a particular method to execute process 1100. It should be noted that process 1100 or any step thereof could be performed on, or provided by, any of the devices shown in FIGS. 6-7.

Process 1100 begins at 1102, where the media guidance application receives (e.g., via control circuitry 604 (FIG. 6)) a first user input (e.g., via user input interface 610 (FIG. 6)) corresponding to a first directional navigation command. For example, the media guidance application may receive (e.g., via control circuitry 604 (FIG. 6)) a user input via a user input interface (e.g., via user input interface 610 (FIG. 6)), such as a remote control. The media guidance application may determine (e.g., via control circuitry 604 (FIG. 6)) whether the user input corresponds to a directional navigation command (e.g., navigating in the down direction with a "DOWN" button) or a different command (e.g., to enter a VOD menu with a "VOD" button) based on comparing the received user input with a stored list of commands associated with particular user inputs.

Process 1100 continues to 1104, where the media guidance application determines (e.g., via control circuitry 604 (FIG. 6)) if the first directional navigation command matches an initial navigation command for a navigation sequence. For example, the media guidance application may access (e.g., via control circuitry 604 (FIG. 6)) a data structure containing navigation sequences, stored either locally in memory (e.g., storage 608 (FIG. 6)) or remotely at a server (e.g., media guidance data source 718 (FIG. 7)) accessible via a communications network (e.g., communications network 714 (FIG. 7)), and compare the received directional navigation command with the first navigation command of each stored navigation sequence in the data structure. If, at step 1104, the media guidance application determines that the first directional navigation command does not match an initial navigation command for a navigation sequence, process 1100 continues to 1106, where the media guidance application navigates (e.g., via control circuitry 604 (FIG. 6)) according to a direction associated with the first navigation command to an indicator. For example, the media guidance application may navigate (e.g., via control circuitry 604 (FIG. 6)) based on a direction associated with the received command (e.g., down one indicator) as described above with respect to FIG. 10.

If, at step 1104, the media guidance application determines that the first directional navigation command does match an initial navigation command for a navigation sequence, process 1100 continues to 1108, where the media guidance application stores (e.g., via control circuitry 604 (FIG. 6)) the last input directional navigation command. For example, the media guidance application may store (e.g., via control circuitry 604 (FIG. 6)) in a data structure (e.g., in storage 608 (FIG. 6)) each received directional navigation command from the user (e.g., via user input interface 610 (FIG. 6)) in the order each command was received.

Process 1100 continues to 1110, where the media guidance application determines (e.g., via control circuitry 604 (FIG. 6)) if a subsequent directional navigation command was received within a threshold time period of a previous directional navigation command. For example, as described above with respect to FIGS. 1-3 and 8-10, the media guidance application may start (e.g., via control circuitry 604 (FIG. 6)) a timer for the threshold period of time (e.g., 0.5 seconds). If a subsequent directional navigation command is received within the threshold time period, process 1100 may return to 1108, described above. For example, for each directional navigation command received from the user within the threshold period of time of the previously received directional navigation command, the media guidance application may store (e.g., via control circuitry 604 (FIG. 6)) an indication of the received command in a data structure.

If another directional navigation command is not received within the threshold time period of the previous directional navigation command, process 1100 continues to 1112, where the media guidance application retrieves (e.g., via control circuitry 604 (FIG. 6)) the stored directional navigation commands input by the user. For example, the media guidance application may retrieve (e.g., via control circuitry 604 (FIG. 6)) from storage (e.g., storage 610 (FIG. 6)) an array containing each received command in the order it was received.

Process 1100 continues to 1114, where the media guidance application compares (e.g., via control circuitry 604 (FIG. 6)) the stored directional navigation commands in the order the directional navigation commands were input by the user with directional navigation commands corresponding to each navigation sequence of a plurality of stored navigation sequences. For example, the media guidance application may retrieve (e.g., via control circuitry 604 (FIG. 6)) each ordered sequence of commands corresponding to a navigation sequence and compare them with the stored commands received from the user. Specifically, the media guidance application may retrieve (e.g., via control circuitry 604 (FIG. 6)) a second received command from the user and compare (e.g., via control circuitry 604 (FIG. 6)) to a second command of a stored navigation sequence (e.g., based on indices of arrays). The media guidance application (e.g., via control circuitry 604 (FIG. 6)) may execute a for-loop to iterate through each navigation sequence and compare the navigation commands for the sequence to the navigation commands received from the user.

Process 1100 continues to 1116, where the media guidance application determines (e.g., via control circuitry 604 (FIG. 6)) whether the stored directional navigation commands input by the user complete a stored navigation sequence. For example, the media guidance application may determine (e.g., via control circuitry 604 (FIG. 6)) that each command of an ordered series of commands received from the user matches commands (in the same order) of a navigation sequence. In some embodiments, a navigation sequence is completed regardless of whether a user enters additional extraneous directional navigation commands (i.e., additional commands after the sequence). In other embodiments, the extraneous directional navigation commands may be compared to the sequence to see if they are a portion of the sequence, which may lead to the navigation instruction corresponding to the sequence being adjusted, as described above with respect to FIG. 3.

If, at 1116, the media guidance application determines that the stored directional navigation commands input by the user do complete the stored navigation sequence, process 1100 continues to 1118, where the media guidance application navigates (e.g., via control circuitry 604 (FIG. 6)) according to an instruction associated with the completed navigation sequence to another indicator. For example, the media guidance application may retrieve (e.g., via control circuitry 604 (FIG. 6)) a stored instruction associated with the completed navigation sequence from a field in a data structure. The media guidance application may determine (e.g., via control circuitry 604 (FIG. 6)), based on the instruction instead of the received commands themselves, a number of indicators to navigate through and a direction to navigate. The media guidance application may then navigate (e.g., update display 612 (FIG. 6)) based on an indicator determined to be selected based on the number of indicators to navigate through and the direction to navigate.

If, at 1116, the media guidance application determines that the stored directional navigation commands input by the user do not complete the stored navigation sequence, process 1100 continues to 1120, where the media guidance application navigates (e.g., via control circuitry 604 (FIG. 6)) according to directions associated with each directional navigation command received from the user to another indicator. For example, as described above with respect to FIG. 10, the media guidance application may determine (e.g., via control circuitry 604 (FIG. 6)), based on directions associated with each received directional navigation command, a particular indicator to navigate to. The media guidance application may navigate (e.g., via control circuitry 604 (FIG. 6)) to that particular indicator.

It is contemplated that the steps or descriptions of each of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 6-7 could be used to perform one or more of the steps in FIG. 11.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for navigating between groups of media assets, the method comprising:

linking a plurality of groups of media assets and a first plurality of media asset identifiers with a first instance of a first display template, wherein the first plurality of media asset identifiers is associated with a first group of media assets of the plurality of groups of media assets;

generating for display the first instance of the first display template including a first plurality of indicators for the plurality of groups of media assets and a second plurality of indicators for the first plurality of media asset identifiers;

receiving a user input of a first directional navigation command;

determining that a second directional navigation command is received within a threshold time period from when the first directional navigation command is received; and in response to determining that the second directional navigation command is received within the threshold time period:

linking the plurality of groups of media assets and additional groups of media assets with a second instance of a second display template;

generating for display the second instance of the second display template including a third plurality of indicators for (1) the plurality of groups of media assets and (2) the additional groups of media assets;

comparing the first directional navigation command and the second directional navigation command with a plurality of stored directional navigation commands to determine a first direction associated with the first directional navigation command and a second direction associated with the second directional navigation command;

navigating, according to the first direction and the second direction, from a first indicator for the first group of media assets to a second indicator for a second group of media assets;

linking a second plurality of media asset identifiers, instead of the first plurality of media asset identifiers, with the first instance of the first display template, wherein the second plurality of media asset identifiers is associated with the second group of media assets; and generating for display the first instance of the first display template including a fourth plurality of indicators for the second plurality of media asset identifiers.

2. The method of claim 1, further comprising:

generating a first data structure according to the first display template, for the first instance of the first display template, wherein the first data structure includes for each of the plurality of groups of media assets and for each of the first plurality of media asset identifiers a first field, a second field, and a third field;

storing in each of the first field an identifier associated with one of the plurality of groups of media assets or one of the first plurality of media asset identifiers;

storing in each of the second field an indication of whether a corresponding identifier in the associated first field is associated with one of the plurality of groups of media assets or associated with one of the first plurality of media asset identifiers; and storing in each of the third field a flag indicating whether an indicator associated with the corresponding identifier is to be displayed as selected.

3. The method of claim 2, wherein generating for display the second instance of the second display template including the third plurality of indicators for (1) the plurality of groups of media assets and (2) the additional groups of media assets comprises:
   determining that a first indicator of the third plurality of indicators corresponds to a first identifier that is to be displayed as selected; and
   visually distinguishing the first indicator from other indicators in the third plurality of indicators.

4. The method of claim 2, wherein generating for display the first instance of the first display template comprises:
   retrieving, from each first field in the first data structure, a corresponding identifier;
   retrieving, from each second field in the data structure, the indication of whether the identifier in the associated first field is for one of the plurality of groups of media assets or one of the first plurality of media asset identifiers;
   formatting indicators for each retrieved identifier based on the indication of whether the identifier in the associated first field is for one of the plurality of groups of media assets or one of the first plurality of media asset identifiers; and
   generating for display each formatted indicator, wherein each formatted indicator associated with the plurality of groups of media assets is visually distinguished from each formatted indicator associated with the first plurality of media asset identifiers.

5. The method of claim 1, wherein navigating, according to the first direction and the second direction, from the first indicator for the first group of media assets to the second indicator for the second group of media assets comprises:
   updating a first flag of a corresponding third field associated with the first indicator to indicate that the first indicator is no longer selected; and
   updating a second flag of a corresponding third field associated with the second indicator to indicate that the second indicator is selected.

6. The method of claim 1, further comprising:
   receiving a third directional navigation command within the threshold time period from when the second directional navigation command is received;
   comparing the third directional navigation command with each initial directional navigation command associated with each navigation sequence of a plurality of stored navigation sequences, wherein each navigation sequence comprises a series of ordered directional navigation commands;
   determining, based on the comparing, that the third directional navigation command is an initial directional navigation command for one or more stored navigation sequences; and
   in response to the determining that the third directional navigation command is the initial directional navigation command for one or more stored navigation sequences:
      receiving at least one subsequent directional navigation command, wherein each subsequent directional navigation command of the at least one subsequent directional navigation command is received within a threshold time from when an immediately preceding directional navigation command was received;
      comparing the at least one subsequent directional navigation command with remaining directional navigation commands of the one or more stored navigation sequences;
      determining, based on the at least one subsequent directional navigation command matching the remaining directional navigation commands for a navigation sequence of the one or more navigation sequences, that the at least one subsequent directional navigation command completes the navigation sequence; and
      navigating, based on an instruction associated with the completed navigation sequence, from the second indicator for the second group of media assets to a third indicator for a third group of media assets.

7. The method of claim 6, wherein determining that the at least one subsequent directional navigation command completes the navigation sequence comprises:
   determining that the at least one subsequent directional navigation command includes additional commands after the completed navigation sequence;
   determining whether the additional commands correspond to a portion of the completed navigation sequence;
   in response to determining that the additional commands correspond to the portion of the completed navigation sequence, adjusting the instruction associated with the completed navigation sequence; and
   navigating, based on the adjusted instruction, to a fourth indicator for a fourth group of media assets.

8. The method of claim 1, wherein generating for display the first instance of the first display template including the fourth plurality of indicators for the second plurality of media asset identifiers comprises:
   determining a subset of (1) the plurality of groups of media assets and (2) the additional groups of media assets that were not navigated through based on the first directional navigation command and the second directional navigation command;
   removing links in the first instance of the first display template to the plurality of groups of media assets;
   linking the subset with the first instance of the first display template; and
   generating for display a fifth plurality of indicators for the subset.

9. The method of claim 1, further comprising:
   generating a second data structure according to the second display template, for the second instance of the second display template, wherein the second data structure includes for each of the plurality of groups of media assets and for each of the additional groups of media assets a fourth field; and
   storing in each of the fourth field one or more coordinates defining a display location for a corresponding identifier stored in an associated first field, wherein the one or more coordinates define a row of a plurality of rows and a column of a plurality of columns for displaying an indicator associated with a corresponding identifier.

10. The method of claim 1, wherein navigating to the second indicator for the second group of media assets comprises:
   determining a duration associated with the second navigation command;
   comparing the duration with a plurality of stored durations, wherein each of the stored durations corresponds to instructions to a number of indicators to navigate through; and
   based on comparing the duration with a plurality of stored durations, determining the number of indicators to navigate through.

11. A system for navigating between groups of media assets, the system comprising:
   control circuitry configured to:

link a plurality of groups of media assets and a first plurality of media asset identifiers with a first instance of a first display template, wherein the first plurality of media asset identifiers is associated with a first group of media assets of the plurality of groups of media assets;

generate for display the first instance of the first display template including a first plurality of indicators for the plurality of groups of media assets and a second plurality of indicators for the first plurality of media asset identifiers;

receive a user input of a first directional navigation command;

determine that a second directional navigation command is received within a threshold time period from when the first directional navigation command is received; and in response to determining that the second directional navigation command is received within the threshold time period:

link the plurality of groups of media assets and additional groups of media assets with a second instance of a second display template;

generate for display the second instance of the second display template including a third plurality of indicators for (1) the plurality of groups of media assets and (2) the additional groups of media assets;

compare the first directional navigation command and the second directional navigation command with a plurality of stored directional navigation commands to determine a first direction associated with the first directional navigation command and a second direction associated with the second directional navigation command;

navigate, according to the first direction and the second direction, from a first indicator for the first group of media assets to a second indicator for a second group of media assets;

link a second plurality of media asset identifiers, instead of the first plurality of media asset identifiers, with the first instance of the first display template, wherein the second plurality of media asset identifiers is associated with the second group of media assets; and generate for display the first instance of the first display template including a fourth plurality of indicators for the second plurality of media asset identifiers.

12. The system of claim 11, wherein the control circuitry is further configured to:

generate a first data structure according to the first display template, for the first instance of the first display template, wherein the first data structure includes for each of the plurality of groups of media assets and for each of the first plurality of media asset identifiers a first field, a second field, and a third field;

store in each of the first field an identifier associated with one of the plurality of groups of media assets or one of the first plurality of media asset identifiers;

store in each of the second field an indication of whether a corresponding identifier in the associated first field is associated with one of the plurality of groups of media assets or associated with one of the first plurality of media asset identifiers; and store in each of the third field a flag indicating whether an indicator associated with the corresponding identifier is to be displayed as selected.

13. The system of claim 12, wherein the control circuitry is further configured, when generating for display the second instance of the second display template including the third plurality of indicators for (1) the plurality of groups of media assets and (2) the additional groups of media assets, to:

determine that a first indicator of the third plurality of indicators corresponds to a first identifier that is to be displayed as selected; and visually distinguish the first indicator from other indicators in the third plurality of indicators.

14. The system of claim 12, wherein the control circuitry is further configured, when generating for display the first instance of the first display template, to:

retrieve, from each first field in the first data structure, a corresponding identifier;

retrieve, from each second field in the data structure, the indication of whether the identifier in the associated first field is for one of the plurality of groups of media assets or one of the first plurality of media asset identifiers;

format indicators for each retrieved identifier based on the indication of whether the identifier in the associated first field is for one of the plurality of groups of media assets or one of the first plurality of media asset identifiers; and generate for display each formatted indicator, wherein each formatted indicator associated with the plurality of groups of media assets is visually distinguished from each formatted indicator associated with the first plurality of media asset identifiers.

15. The system of claim 11, wherein the control circuitry is further configured, when navigating, according to the first direction and the second direction, from the first indicator for the first group of media assets to the second indicator for the second group of media assets, to:

update a first flag of a corresponding third field associated with the first indicator to indicate that the first indicator is no longer selected; and update a second flag of a corresponding third field associated with the second indicator to indicate that the second indicator is selected.

16. The system of claim 11, wherein the control circuitry is further configured to:

receive a third directional navigation command within the threshold time period from when the second directional navigation command is received;

compare the third directional navigation command with each initial directional navigation command associated with each navigation sequence of a plurality of stored navigation sequences, wherein each navigation sequence comprises a series of ordered directional navigation commands;

determine, based on the comparing, that the third directional navigation command is an initial directional navigation command for one or more stored navigation sequences; and in response to the determining that the third directional navigation command is the initial directional navigation command for one or more stored navigation sequences:

receive at least one subsequent directional navigation command, wherein each subsequent directional navigation command of the at least one subsequent directional navigation command is received within a threshold time from when an immediately preceding directional navigation command was received;

compare the at least one subsequent directional navigation command with remaining directional navigation commands of the one or more stored navigation sequences;

determine, based on the at least one subsequent directional navigation command matching the remaining directional navigation commands for a navigation sequence of the one or more navigation sequences, that the at least one subsequent directional navigation command completes the navigation sequence; and navigate, based on an instruction associated with the completed navigation sequence, from the second indicator for the second group of media assets to a third indicator for a third group of media assets.

17. The system of claim 16, wherein the control circuitry is further configured, when determining that the at least one subsequent directional navigation command completes the navigation sequence, to:

determine that the at least one subsequent directional navigation command includes additional commands after the completed navigation sequence;

determine whether the additional commands correspond to a portion of the completed navigation sequence;

in response to determining that the additional commands correspond to the portion of the completed navigation sequence, adjust the instruction associated with the completed navigation sequence; and navigate, based on the adjusted instruction, to a fourth indicator for a fourth group of media assets.

18. The system of claim 11, wherein the control circuitry is further configured, when generating for display the first instance of the first display template including the fourth plurality of indicators for the second plurality of media asset identifiers, to:

determine a subset of (1) the plurality of groups of media assets and (2) the additional groups of media assets that were not navigated through based on the first directional navigation command and the second directional navigation command;

remove links in the first instance of the first display template to the plurality of groups of media assets;

link the subset with the first instance of the first display template; and generate for display a fifth plurality of indicators for the subset.

19. The system of claim 11, wherein the control circuitry is further configured to:

generate a second data structure according to the second display template, for the second instance of the second display template, wherein the second data structure includes for each of the plurality of groups of media assets and for each of the additional groups of media assets a fourth field; and store in each of the fourth field one or more coordinates defining a display location for a corresponding identifier stored in an associated first field, wherein the one or more coordinates define a row of a plurality of rows and a column of a plurality of columns for displaying an indicator associated with a corresponding identifier.

20. The system of claim 11, wherein the control circuitry is further configured, when navigating to the second indicator for the second group of media assets, to:

determine a duration associated with the second navigation command;

compare the duration with a plurality of stored durations, wherein each of the stored durations corresponds to instructions to a number of indicators to navigate through; and based on comparing the duration with a plurality of stored durations, determine the number of indicators to navigate through.

* * * * *